United States Patent
Chow et al.

(10) Patent No.: US 7,117,070 B2
(45) Date of Patent: Oct. 3, 2006

(54) POWER FLOW CONTROLLER RESPONSIVE TO POWER CIRCULATION DEMAND FOR OPTIMIZING POWER TRANSFER

(75) Inventors: Joe H. Chow, Scotia, NY (US); Xuan Wei, Troy, NY (US); Bruce Fardanesh, Upper Saddle River, NJ (US); Abdel-Aty Edris, Sunnyvale, CA (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 10/882,323

(22) Filed: Jun. 29, 2004

(65) Prior Publication Data

US 2005/0071050 A1    Mar. 31, 2005

Related U.S. Application Data

(60) Provisional application No. 60/483,694, filed on Jun. 30, 2003.

(51) Int. Cl.
    *G05F 1/66*    (2006.01)
(52) U.S. Cl. .................. 700/297; 700/286; 307/82; 323/205; 323/207
(58) Field of Classification Search .............. 700/286, 700/291, 295, 297, 298; 307/18, 82, 149; 323/205, 207
    See application file for complete search history.

(56) References Cited

U.S. PATENT DOCUMENTS 5,768,117 A * 6/1998 Takahashi et al. ............ 307/82
6,459,175 B1 * 10/2002 Potega ................... 307/132 M
6,639,328 B1 * 10/2003 Wacknov ...................... 290/52
6,787,933 B1 *  9/2004 Claude et al. ................. 290/52
2003/0085621 A1 *  5/2003 Potega ........................ 307/18

OTHER PUBLICATIONS

Fuerte-Esquivel, C.R. et al., "A Comprehensive Newton-Raphson UPFC Model for the Quadratic Power Flow Solution of Practical Power Networks", IEEE Transactions on Power Systems, vol. 15, pp. 102-109, 2000.
Xiao, Y. et al., "Power Flow Control Approach to Power Systems with Embedded FACTS Devices", IEEE Transactions on Power Systems, vol. 17, pp. 943-950, 2002.
Bian, J. et al., "A Study of Equipment Sizes and Constraints for a Unified Power Flow Controller", IEEE Transactions on Power Delivery, vol. 12, pp. 1385-1391, 1997.
Zhang, X.P. et al., "Modeling of the Generalized Unified Power Flow Controller (GUPFC) in a Nonlinear Interior Point OPF," IEEE Transactions on Power Systems, vol. 16, pp. 367-373, 2001.

(Continued)

*Primary Examiner*—Leo Picard
*Assistant Examiner*—Charles Kasenge
(74) *Attorney, Agent, or Firm*—Morgan, Lewis & Bockius LLP

(57) ABSTRACT

A power flow controller responsive to power circulation demand for optimizing power transfer is disclosed. When a power flow controller operates at its rated capacity, it can no longer regulate from-bus voltage set-points, line power flow set-points, or both. In such cases, the power flow controller switches to power circulation set-point control without exceeding the rated capacities of the voltage-sourced converters in the power flow controller. Power-voltage (PV) curves associated with voltage stability analysis for maximizing power transfer can be generated and stored for use with a power flow controller operating in automatic power flow control mode.

22 Claims, 15 Drawing Sheets

OTHER PUBLICATIONS

Liu, J.Y. et al., "Strategies for Handling UPFC Constraints in Steady-State Power Flow and Voltage Control," IEEE Transactions on Power Systems, vol. 15, pp. 566-571, 2000.

Sen, K. and Stacey, E.J., "UPFC-Unified Power Flow Controller: Theory, Modeling and Applications," IEEE Transactions on Power Delivery, vol. 13, pp. 1454-1460, 1998.

Schauder, C.D. et al., "Operation of the Unified Power Flow Controller (UPFC) under Practical Constraints," IEEE Transactions on Power Delivery, vol. 13, pp. 630-637, 1998.

Hingorani, N.G. and Gyugyi, L., Understanding Facts, Concepts and Technology of Flexible AC Transmission Systems, Chapter 8, pp. 297-352, 2000.

* cited by examiner

POWER FLOW CONTROLLER RESPONSIVE TO POWER CIRCULATION DEMAND FOR OPTIMIZING POWER TRANSFER

RELATED APPLICATION

This application claims the benefit of priority of U.S. Provisional Application No. 60/483,694, filed Jun. 30, 2003, which provisional patent application is incorporated by reference herein in its entirety.

TECHNICAL FIELD

The invention relates generally to the control of power flow in electric power transmission lines, and more particularly to power flow dispatch strategies for optimizing power transfer.

BACKGROUND

Flexible Alternating Current Transmission Systems (FACTS) are used for the dynamic control of voltage, impedance and phase angle of high voltage alternating current (ac) electrical power transmission lines. Since the concept of FACTS was introduced, a family of power electronic equipment has emerged for controlling and optimizing the flow of electrical power in electrical power transmission lines. This equipment makes use of large rating (4500 V to 6000 V, 4000 A to 6000 A) gate turn-off thyristors (GTOs) in high power inverter configurations that can be controlled to behave as three-phase sinusoidal voltage sources. FACTS controllers are operated synchronously with the transmission line and can be connected either in parallel, producing controllable shunt reactive current for voltage regulation, or in series with the line, for controlling the flow of power directly. The family of FACTS controllers includes the Static Synchronous Compensator (STATCOM), the Synchronous Series Compensator (SSSC), the Unified Power Flow Controller (UPFC), the Interline Power Flow Controller (IPFC), and the Generalized Unified Power Flow Controller (GUPFC). The basic theory behind the UPFC is described in L. Gyugyi, et al., "The Unified Power Flow Controller: A New Approach to Power Transmission Control," *IEEE Transactions on Power Delivery*, vol. 10, pp. 1085–0193, 1995. The basic theories behind the IPFC and the GUPFC can be found in, respectively, S. Zelingher et al., "Convertible Static Compensator Project—Hardware Overview," *Proc. IEEE Winter Power Meeting*, vol. 4, pp. 2511–2517, 2000, and B. Fardanesh et al., "Multi-Converter FACTS Devices: The Generalized Unified Power Flow Controller (GUPFC)," *Proc. IEEE Winter Power Meeting*, vol. 4, pp. 2511–2517, 2000.

For Voltage-Sourced Converter (VSC) based FACTS controllers, a maximum power transfer typically occurs when the controller is operated at its rated capacity (e.g., maximum current, voltage, or MVA rating). For STATCOM and SSSC devices, power transfer at rated capacities can be achieved by relaxing certain operating parameters or setpoints to ensure reliable power transfer. For UPFC, IPFC and GUPFC devices, however, a reliable power transfer at rated capacities is more complex because of the ability of these controllers to circulate active power.

One problem with operating a FACTS device at its rated capacity is the heightened risk of voltage collapse. Voltage collapse occurs when a power controller attempts to serve more load than the output voltage of the controller can support. Thus, a FACTS device operating at its rated capacity should provide maximum power transfer, while avoiding voltage collapse, i.e., maintain voltage stability.

Accordingly, what is needed is a power dispatch strategy for enabling a FACTS device to provide maximum power transfer and voltage stability, while operating at or below its rated capacity. Such a dispatch strategy should be easily integrated into existing FACTS designs, including without limitation UPFC, IPFC and GUPFC designs.

SUMMARY

The disclosed embodiments overcome the deficiencies of conventional systems and methods by providing a power flow controller responsive to power circulation demand for optimizing power transfer in a power network. When a power flow controller operates at its rated capacity, the coupled voltage-sourced converters in the power flow controller can no longer regulate from-bus voltage setpoints, line power flow setpoints, or both. In such cases, the power flow controller switches to a power circulation setpoint control without exceeding the rated capacities of the voltage-sourced converters. By replacing a number of control variables having complex interactions with a single circulating power control variable, the role of a power system operator in selecting a power dispatch strategy is greatly simplified, thus resulting in a dispatch strategy that is more efficient and less prone to human error than conventional dispatch strategies, where the system operator may have to specify multiple control variables in real-time under post-contingency conditions.

In some embodiments, a power flow controller includes a controller responsive to a circulating power demand. A first voltage-sourced converter is coupled to the controller and adapted to be coupled to a transmission line. The first voltage-sourced converter is configured by the controller to control power flow in the transmission line.

In some embodiments the power flow controller includes a second voltage-sourced converter coupled to the first voltage-sourced converter via a direct current link and adapted to be coupled to the transmission line. The second voltage-sourced converter is also configured by the power controller to control power flow in the transmission line.

In some embodiments, a method of controlling power flow in a transmission line using a power flow controller operated at rated capacity includes: determining if a power flow controller coupled to the transmission line is operating at rated capacity; determining a circulating power demand in response to the power flow controller operating at rated capacity; and configuring the power flow controller based on the circulating power demand to control power flow in the transmission line.

In some embodiments, the circulating power demand is efficiently computed in a Newton-Raphson (NR) algorithm based on an injected series voltage model, which takes into account various constraint equations that govern the operation of coupled VSCs at or below their rated respective capacities.

DESCRIPTION OF EMBODIMENTS

Overview of UPFC Architecture

While the following description is based on a UPFC architecture, the disclosed embodiments can be extended to other types of FACTS devices having two or more coupled VSCs, including without limitation IPFC and GUPFC devices.

Figure 1:
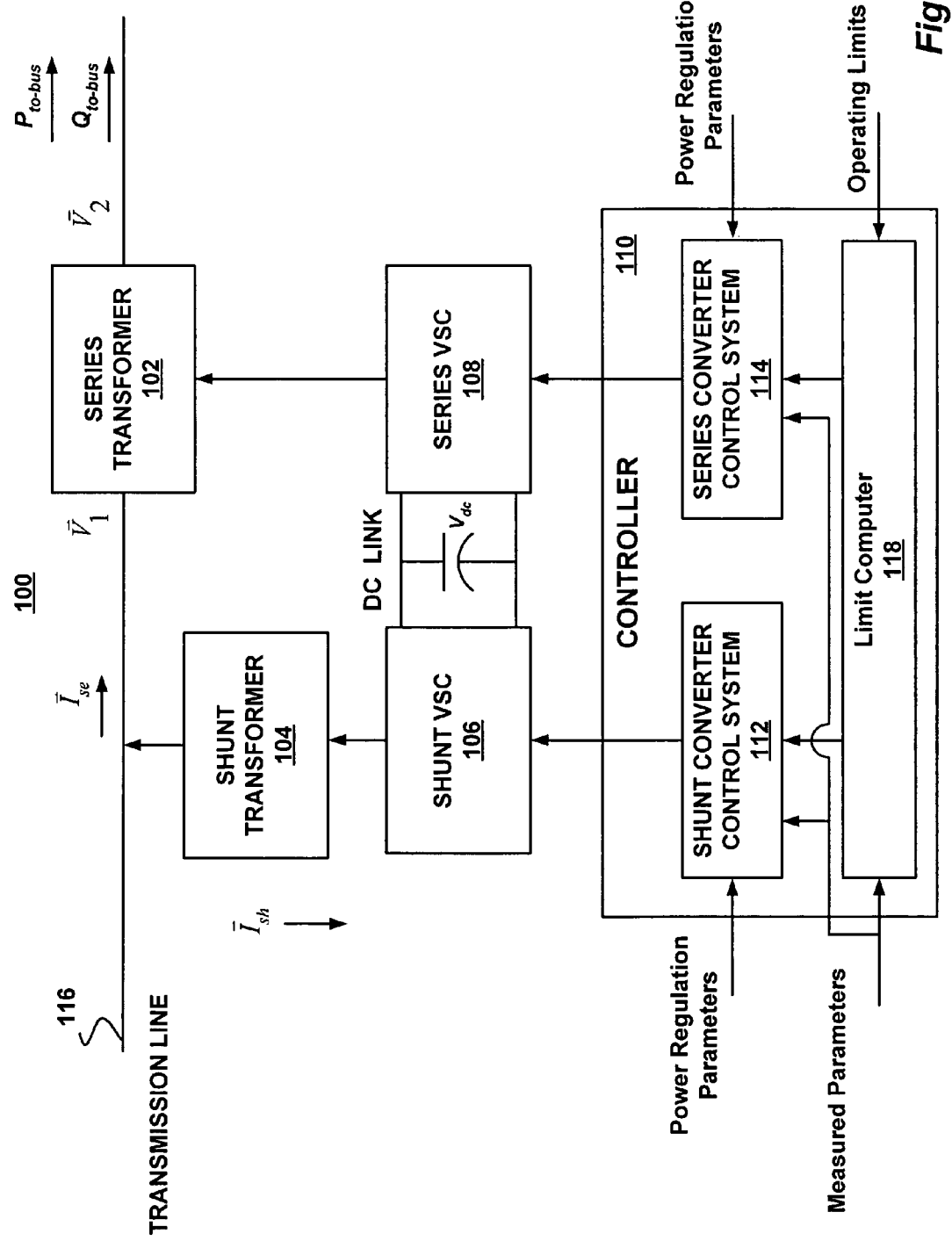
FIG. 1 is a block diagram of a UPFC responsive to power circulation demand.

FIG. 1 is a block diagram showing the main elements of a UPFC system 100, which is responsive to power circulation demand. The UPFC system 100 includes a series insertion transformer 102, a shunt transformer 104, a shunt VSC 106, a series VSC 108, a controller 110 and a limit computer 118. In some embodiments, the shunt VSC 106 and the series VSC 108 are coupled back-to-back and operated from a common dc link voltage $V_{dc}$, which is typically provided by a dc storage capacitor. This arrangement functions as an ideal ac-to-ac power converter in which the real power can freely flow in either direction on a transmission line 116 between the ac terminals of the VSCs 106 and 108. In addition, each VSC 106, 108, can independently generate or absorb reactive power flow Q at its own ac output terminal.

The series VSC 108 provides the primary function of the UPFC system 100 by injecting a voltage $\vec{V}_{m2}$ with controllable magnitude $V_{m2}$ and phase angle in series with the transmission line 116 via the series transformer 102. The injected voltage $\vec{V}_{m2}$ acts essentially as a synchronous ac voltage source. The transmission line 116 current $\vec{I}$ flows through this voltage source resulting in reactive and real power exchange between the voltage source and the ac system. The reactive power flow Q exchanged at the terminal of the series transformer 102 is generated internally by the series VSC 108. The real power flow P exchanged at the terminal of the series transformer 102 is converted into dc power, which appears at the dc link as a positive or negative real power demand.

The shunt VSC 106 supplies or absorbs the real power flow P demanded by the series VSC 108 at the dc link to support a real power exchange resulting from series voltage injections into the transmission line 116 by the series VSC 108. The dc link power demand of the series VSC 108 is converted back to ac by the shunt VSC 106 and coupled to the transmission line 116 via the shunt transformer 104. In addition to the real power need of the series VSC 108, the shunt VSC 106 can also generate or absorb controllable reactive power flow Q to provide independent shunt reactive compensation for the transmission line 116.

In some embodiments, the shunt and series VSCs 104, 108, each include a number of asymmetric turn-off devices, such as Gate Turn-off Thyristors (GTOs) with a parallel diode connected in reverse. In other embodiments, the turn-off devices are Insulated Gate Bipolar Transistors (IGBTs), which typically have a parallel reverse diode built in as part of a complete integrated device suitable for VSCs. The basic operation of a VSC is to generate ac voltage from dc voltage by alternately closing and opening the turn-off devices in accordance with an appropriate gate pattern logic.

The controller 110 includes shunt converter controls 112 and series converter controls 114 for controlling the shunt and series VSCs 106, 108, respectively. The shunt converter controls 112 and the series converter controls 114 receive as inputs various measured parameters and power regulation parameters (e.g., setpoints), which are used to generate injection voltages and phase angles in accordance with a circulation power desired dispatch strategy, as described more fully with respect to FIGS. 2–15.

UPFC Load Flow Model

Figure 2:
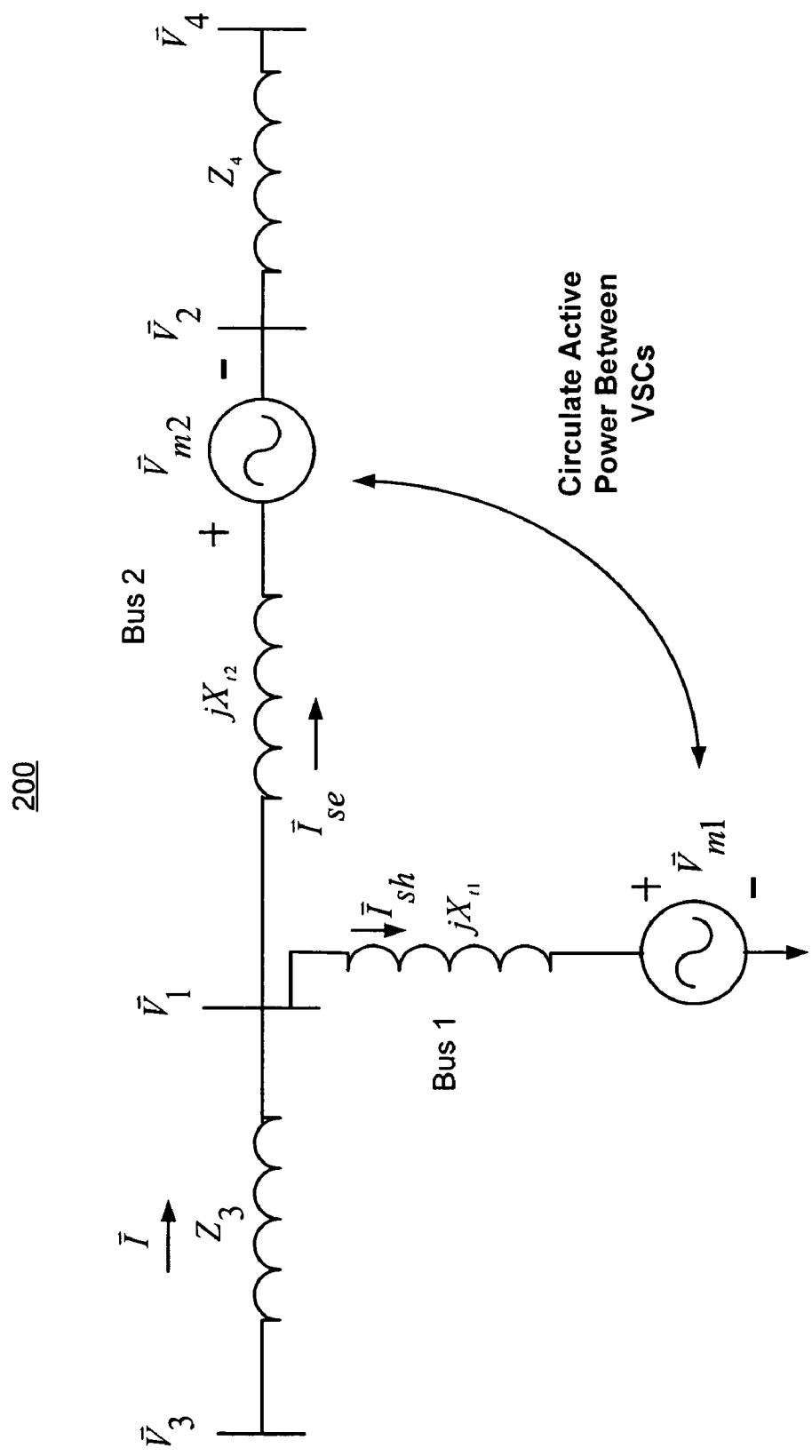
FIG. 2 is a circuit representation of a loadflow model for the UPFC shown in FIG. 1.

FIG. 2 is a circuit representation of a loadflow model 200 for a UPFC. A UPFC typically includes a shunt voltage-sourced converter (VSC) coupled to a series VSC via one or more dc capacitors, such that active power $P_c$ circulates between the VSCs. The shunt VSC can be modeled by an injected shunt voltage source $\vec{V}_{m1}$ coupled in series with an equivalent shunt transformer reactance $X_{t1}$. The series VSC can be modeled by an injected series voltage source $\vec{V}_{m2}$ coupled in series by an equivalent series transformer reactance $X_{t2}$. Thus, the voltage variables of an N-bus power system with a UPFC can be ordered according to Equation (1):

$$[\vec{V}_1 \vec{V}_2 \ldots \vec{V}_N \vec{V}_{m1} \vec{V}_{m2}]^T, \qquad (1)$$

where $\vec{V}_i = V_i e^{j\theta_i}$ is the complex bus voltage for the ith bus and $\vec{V}_{mj} = V_{mj} e^{j\alpha_j}$ is the complex injection voltage due to the jth VSC.

By coupling the dc capacitors of the VSCs, a power flow controller can operate with the flexibility of circulating active power $P_c$ between two VSCs. For the power flow controller model in FIG. 1, the active powers injected into Bus 1 by $\vec{V}_{m1}$ and into the line by $\vec{V}_{m2}$ are given, respectively, by the following equations:

$$P_{sh} = -\frac{V_1 V_{m1} \sin(\theta_1 - \alpha_1)}{X_{t1}}, \qquad (2a)$$

$$P_{se} = \frac{V_{m2}(V_2 \sin(\theta_2 - \alpha_2) - V_1 \sin(\theta_1 - \alpha_2))}{X_{t2}}. \qquad (2b)$$

Because the net active power generation by the two coupled VSCs is zero, neglecting power losses, the loadflow equations are as follows:

$$V_1 = V_{1d} \tag{3a}$$

$$\frac{V_2(V_{m2}\sin(\theta_2 - \alpha_2) - V_1\sin(\theta_2 - \theta_1))}{X_{t2}} = P_d \tag{3b}$$

$$\frac{-V_2(V_2 - V_1\cos(\theta_2 - \theta_1) + V_{m2}\cos(\theta_2 - \alpha_2))}{X_{t2}} = Q_d \tag{3c}$$

$$P_{sh} + P_{se} = 0, \tag{3d}$$

where $P_d$ and $Q_d$ are the desired line active and reactive powers, respectively, flowing into Bus 2 (i.e., the to-bus) and $V_{1d}$ is the desired voltage magnitude at Bus 1 (i.e., the from-bus). Equations (3) are generally valid for a UPFC operating at below its rated capacity.

Newton-Raphson Algorithm

In some embodiments, a solution to the loadflow equations (3) can be determined using a fast converging Newton-Raphson (NR) algorithm with an extended Jacobian matrix to include the sensitivities of the VSC control variables. For example, in an N-bus power network with $N_g$ generators and a UPFC, the loadflow equations can be formulated as N−1 equations $f_P$ for the active power bus injections P, N-$N_g$ equations $f_Q$ for the reactive power bus injections Q, and four VSC equations $F_{VSC}$ of setpoints and power circulation equations (3). The equations can be represented mathematically as:

$$f_P(v) = P \tag{4a}$$

$$f_Q(v) = Q \tag{4b}$$

$$f_{VSC}(v) = R \tag{4c}$$

where $R = [V_{1d} \, P_d \, Q_d \, 0]$ and $v = [V_1 \ldots V_N \, \theta_1 \ldots \theta_N \, V_{m1} \, V_{m2} \, \alpha_1 \, \alpha_2]^T$ is a $2(N+2)-N_g-1$ vector variable of bus voltage magnitudes and angles, with $N_g$ generator bus voltage magnitudes and the angle of the swing bus removed, and injected VSC voltage magnitudes and angles.

To apply the NR algorithm, starting from the solution $v_l$ at the lth iteration, the updated solution is:

$$v_{l+1} = v_l + \beta \Delta v_l, \tag{5}$$

where $\beta$ is a scalar step size to facilitate the convergence, and $\Delta v_l$ is solved from $$J(v_l)\Delta v_l = \Delta S, \tag{6}$$

with $\Delta S$ being the mismatch vector and the Jacobian matrix given by, $$J = \begin{bmatrix} \frac{\partial f_P}{\partial V} & \frac{\partial f_P}{\partial \theta} & \frac{\partial f_P}{\partial V_m} & \frac{\partial f_P}{\partial \alpha} \\ \frac{\partial f_Q}{\partial V} & \frac{\partial f_Q}{\partial \theta} & \frac{\partial f_Q}{\partial V_m} & \frac{\partial f_Q}{\partial \alpha} \\ \frac{\partial f_{VSC}}{\partial V} & \frac{\partial f_{VSC}}{\partial \theta} & \frac{\partial f_{VSC}}{\partial V_m} & \frac{\partial f_{VSC}}{\partial \alpha} \end{bmatrix}. \tag{7}$$

Thus, NR algorithm equations (5) through (7) can be readily built into an existing conventional NR algorithm, such as is described in C. R. Fuerte-Esquivel et al., "A Comprehensive Newton-Raphson UPFC Model for the Quadratic Power Flow Solution of Practical Power Networks," *IEEE Transaction on Power Systems*, vol. 15, pp. 102–109, 2000, which article is incorporated by reference herein. For large data sets, sparse factorization techniques can be used to achieve an efficient solution. Because the NR algorithm updates all the variables in v simultaneously, it achieves quadratic convergence when the iteration is close to the solution point.

An important step in the NR algorithm is the selection of initial conditions for the UPFC system 100. Based on the initial From-Bus and To-Bus voltages $V_1$ and $V_2$, equations (3) can be used to initialize the voltages $\vec{V}_{m1}$ and $\vec{V}_{m2}$.

UPFC Operating Limits

There are a number of practical operating limits that need to be imposed on a UPFC, which are important when assessing its impact on maximum power transfer capability. The following is a list of the limits, where the subscripts max and min denote maximum and minimum values, respectively.

1. Shunt VSC current:

$$|I_{sh}| \leq I_{sh\,max} \tag{8}$$

2. Shunt VSC voltage magnitude:

$$V_{m1} \leq V_{m1\,max} \tag{9}$$

3. Shunt VSC MVA rating:

$$|S_{sh}| \leq S_{sh\,max}, \tag{10}$$

where $S_{sh}$ is the complex power injected into the UPFC from-bus (Bus 1) by the shunt VSC 104.

4. Series VSC voltage magnitude:

$$V_{m2} \leq V_{m2\,max}, \tag{11}$$

5. Line current through series VSC:

$$|I_{se}| \leq I_{se\,max}, \tag{12}$$

6. Series VSC MVA rating:

$$|S_{se}| \leq S_{se\,max}, \tag{13}$$

7. Maximum and minimum line-side voltages of the UPFC:

$$V_{min} \leq |V_2| \leq V_{max}, \tag{14}$$

8. Real power transfer between the series and shunt VSCs:

$$|P_{sh}|, |P_{se}| \leq P_{c\,max}. \tag{15}$$

The above limits are included in the NR loadflow program, but are enforced when it is determined that the UPFC is operating at one or more of the limits. When any one of the limits is reached, some setpoints for the UPFC cannot be regulated. For example, if the MVA rating of the shunt VSC 106 is reached, it can no longer keep the from-bus voltage $V_1$ at the desired setpoint $V_{1d}$. Thus, when the UPFC is operating at one or more of the limits described above, equations (3) can be replaced by limit constraint equations, as described in detail below.

Circulation Power Dispatch Strategy

For a power flow controller operated at or below its rated capacity, a common strategy is to specify three desired setpoints: the desired from-bus voltage $V_{1d}$ and the desired line active and reactive power flow $P_d$ and $Q_d$, respectively, as determined by the loadflow equations (3). Power system planners and operators can readily provide proper values of the setpoints $V_{1d}$ and $P_d$. Although the reactive power flow $Q_d$ affects the voltages at the to-bus, and any buses connected to the to-bus, the specification of the desired line reactive power flow $Q_d$ is not always obvious. Further, the circulating power $P_c$ typically comes as a by-product of the $Q_d$ specification and is not specified directly.

As stated previously, when a power flow controller is operated at any of its limits, one or more of the setpoints $V_{1d}$, $P_d$, and $Q_d$ can no longer be enforced. Instead of arbitrarily discarding one of these equations, a circulation power $P_c$ can be specified when capacity saturation takes place. Using the MVA rating, current magnitude limit, and injected voltage magnitude limit as examples, some exemplary setpoints and constraints used in the dispatch strategy are summarized in Table I. When the shunt VSC saturates, the circulation power $P_c$ and one of the limits $S_{sh\ max}$, $I_{sh\ max}$, or $V_{m1\ max}$ are enforced as appropriate. Similarly, when the series VSC saturates, the circulation power $P_c$ and one of the limits $S_{se\ max}$, $I_{se\ max}$, or $V_{m2\ max}$ are enforced.

TABLE I

Exemplary Setpoints for Regulation Mode and Rated Capacity Mode for a UPFC

|  | Regulation Mode | Shunt VSC Saturate | Series VSC Saturate | Both VSCs Saturate |
|---|---|---|---|---|
| Shunt VSC | $V_{1d}$ | $S_{sh\ max}/$ $I_{sh\ max}/V_{m1\ max}$ | $V_{1d}$ | $S_{sh\ max}/$ $I_{sh\ max}/V_{m1\ max}$ |
|  | $P_{sh} + P_{se} = 0$ | $P_{sh} = -P_c$ | $P_{sh} = -P_c$ | $P_{sh} = -P_c$ |
| Series VSC | $P_d$ | $P_d$ | $S_{se\ max}/$ $I_{se\ max}/V_{m2\ max}$ | $S_{se\ max}/$ $I_{se\ max}/V_{m2\ max}$ |
|  | $Q_d$ | $P_{se} = P_c$ | $P_{se} = P_c$ | $P_{se} = P_c$ |

For example, suppose the MVA rating of the series VSC 108 is reached and at least one of the equations (3b) and (3c) cannot be enforced. In this scenariou, Equation (3b) can be replaced by the limit equation:

$$\sqrt{P_{se}^2 + Q_{se}^2} = S_{se\ max}, \quad (16)$$

where $Q_{se}$ is the reactive power injected into the line by the series VSC 108, given by $$Q_{se} = \frac{-(V_1(V_1 - V_{m2}\cos(\theta_1 - \alpha_2)) + V_2(V_2 + V_{m2}\cos(\theta_2 - \alpha_2)))}{X_{t2}}. \quad (17)$$

Additionally, equations (3c) and (3d) can be replaced by:

$$P_{sh} = -P_c, \quad (18)$$

$$P_{se} = P_c, \quad (19)$$

so that the desired circulating power $P_c$ is specified.

On the other hand, if the shunt VSC 106 reaches its MVA rating, then Equation (3a) can be replaced by the following limit equation:

$$\sqrt{P_{sh}^2 + Q_{sh}^2} = S_{sh\ max} \quad (20)$$

where $Q_{sh}$ is the reactive power injected into Bus 1 by the shunt VSC 106, given by:

$$Q_{sh} = \frac{-V_1(V_{m1}\cos(\theta - \alpha_1) - V_1)}{X_{t1}} \quad (21)$$

Additionally, equations (3c) and (3d) are replaced by circulating power equations (6) and (7).

If both the shunt VSC 106 and the series VSC 108 reach their MVA ratings, then equations (3a) and (3b) are replaced by equations (20) and (16), and equations (3c) and (3d) are replaced by equations (18) and (19).

Similarly, when the UPFC reaches other operating limits, the limit equations (16) and (20) can be activated, and specify power circulation (18) and (19). For the VSC injected voltage magnitude limits, the limit equations are to enforce $V_{m1}$ and $V_{m2}$ at $V_{m1max}$ and $V_{m2max}$, respectively. For the current magnitude limits, the limit equations are $$\frac{|V_1 \varepsilon^{j\theta_1} - V_{m1}\varepsilon^{j\alpha_1}|}{X_{t1}} = I_{sh\max}, \quad (22)$$

$$\frac{|V_1 \varepsilon^{j\theta_1} - V_{m2}\varepsilon^{j\alpha_2} - V_2\varepsilon^{j\theta_2}|}{X_{t2}} = I_{se\max}, \quad (23)$$

The circulation power dispatch strategy described by the equations (16) through (21) is particularly suitable for computing the maximum power transfer limited by voltage stability where both VSCs 106, 108, will operate at their rated capacities. By specifying the power circulation $P_c$, the amount of coupling between the VSCs 106, 108, can be systematically evaluated to achieve optimal results. For example, if $P_c=0$, then the two VSCs are operated separately as a STATCOM and an SSSC. Intuitively, it is expected that by increasing or decreasing $P_c$ from zero (i.e., increasing or decreasing the coupling), the power transfer is improved until the power circulation $P_c$ provides no further benefit or the loadflow equations (3) cease to have a solution.

To implement this circulation power dispatch strategy in the NR loadflow algorithm, the ratings of the VSCs in power flow controller need to be monitored at the end of each iteration. Once it is determined that either the shunt VSC 106 or the series VSC 108 or both VSCs will be operated at rated capacities, the proper limit equations with the power circulation equations (18) and (19) will be utilized as the VSC equations $F_{VSC}$ (4c), and the Jacobian matrix (7) will be modified as described in Appendix A.

Figure 3:
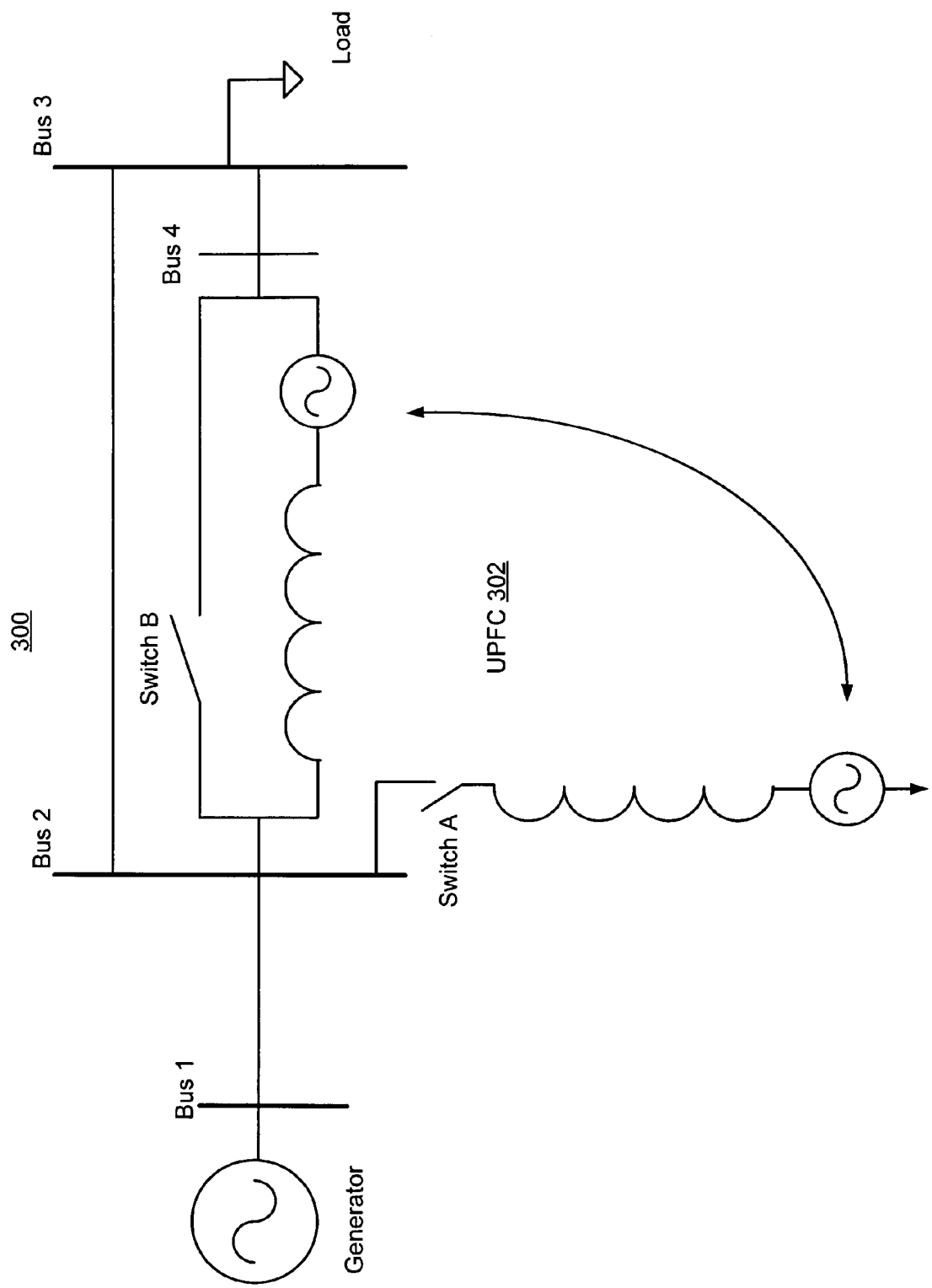
FIG. 3 is a block diagram of a radial test system for generating PV curves.
Figure 4:
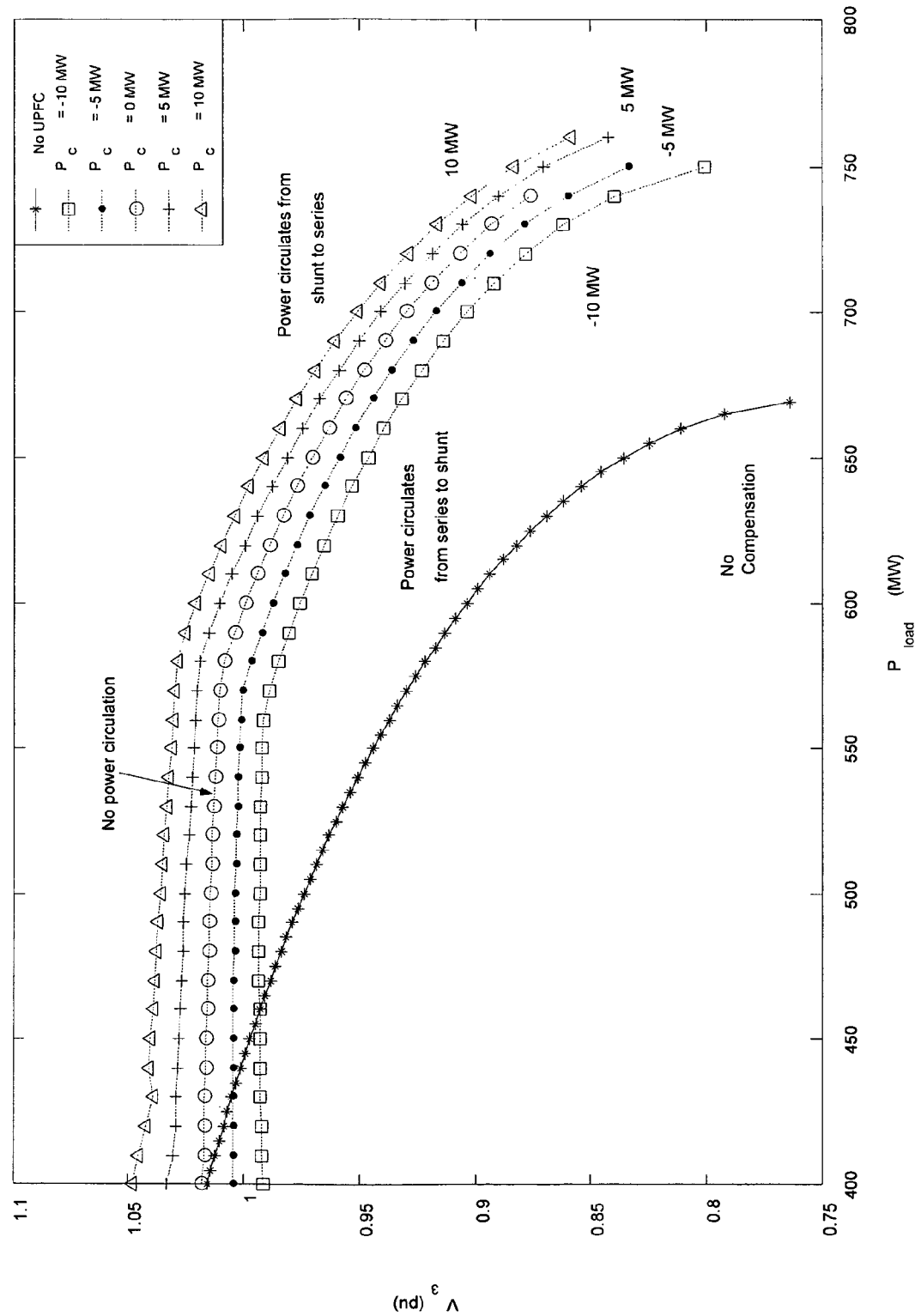
FIG. 4 is a graph of PV curves for Bus 3 in the radial test system shown in FIG. 4.
Figure 5:
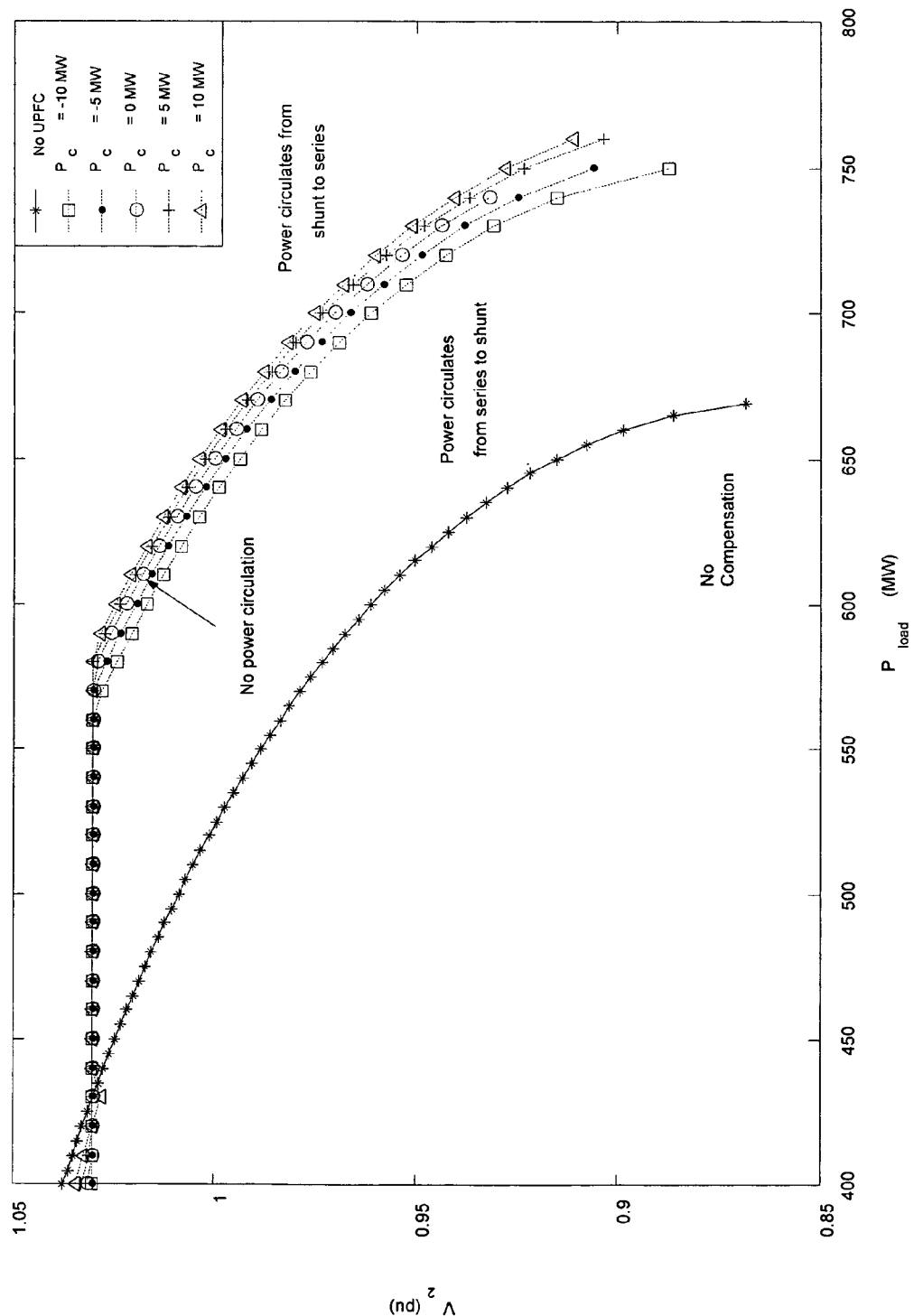
FIG. 5 is a graph of PV curves for Bus 2 in the radial test system shown in FIG. 4.

The circulation power dispatch strategy discussed above can be used to generate useful graphs (e.g., PV curves) for operators and planners, as discussed more fully with respect to FIGS. 3–5.

Generation of PV Curves

A common approach to voltage stability analysis is to increase the power system loading $P_{load}$ and observe the resulting voltage variation V on the critical buses. Such an analysis is commonly presented in the form of power-voltage (PV) curves, which are being used in many power control centers.

To generate consistent PV curves, in some embodiments the UPFC control strategy described above can be modified slightly by enforcing a desired circulating power $P_c$ at multiple operating conditions, regardless of whether the VSCs 106, 108, are at their rated capacities or not. That is, if both VSCs 106, 108, are below their rated capacities, then besides requesting a specific power circulation level via equations (6) and (7), the shunt VSC 106 will regulate the from-bus voltage $V_{1d}$ and the series VSC 108 will regulate the line active power flow $P_d$. The line reactive power flow $Q_d$ is not enforced. In a real-time implementation, the UPFC can be operated from the ($V_{1d}$, $P_d$, $Q_d$) setpoint control to the power circulation control by adjusting the power circulation continuously to the desired operating point using the PV curves.

Test System

FIG. 3 is a block diagram of a radial test system 300 for generating PV curves. The test system 300 includes four Buses 1–4, an equivalent generator and an equivalent load. As shown in FIG. 3, a UPFC 302 is located on one of the parallel lines at Bus 2, which is the electrical midpoint of the system 300. Note that by opening switch A and closing switch B, the UPFC 302 is bypassed, which hereinafter is also referred to as the uncompensated system 300. The UPFC 302 is in service if switch A is closed and switch B is open. For this particular test system, the shunt and the series VSCs 106, 108, have a rating of 50 MVA. Other system 300 parameters are included in Table II below:

TABLE II

Transmission Line Data

| Line | Resistance (pu) | Reactance (pu) | Charging (pu) |
|---|---|---|---|
| 1–2 | 0.00163 | 0.03877 | 0.78800 |
| 2–3 | 0 | 0.07954 | 0.39400 |
| 3–4 | 0 | 0.08154 | 0.39400 |

Note that the shunt transformer 104 and the series transformer 102 of UPFC 302 have reactances of $X_{t1}=0.1$ pu and $X_{t2}=0.002$ pu, respectively.

By increasing the load $P_{load}$ on Bus 3 and the necessary amount of generation at Bus 1, the variation of the Bus 3 voltage $V_3$ can be observed with and without the UPFC 302. For the compensated system (switch A closed, switch B open), power circulations of $P_c=-10, -5, 0, 5, 10$ MW are observed. Note that a positive $P_c$ denotes that power is circulating from the shunt VSC 106 to the series VSC 108. With no saturation, the shunt voltage setpoint and the series active power flow set point are enforced at $V_{1d}=1.03$ pu and with $P_d$ at 80% of the load active power $P_{load}$, respectively. Whenever a VSC rating limit is reached, the voltage or flow setpoint is no longer enforced, but replaced by an MVA limit equation. The resulting set of PV curves for Bus 3 are shown in FIG. 4, which also includes the PV curve of the uncompensated system 300 (switch A open, switch B closed). The marked points on the PV curves indicate values obtained from the converged loadflow solutions. The corresponding PV curves for the UPFC 302 from-bus, $V_2$, are shown in FIG. 5.

As shown in FIG. 4, each UPFC power dispatch having a circulation power $P_c$ enforced at a specified value generates a familiar PV curve. These PV curves clearly demonstrate the impact of power circulation versus no power circulation. The curve with $P_c=0$ represents the stand-alone operation of a STATCOM and an SSSC. For $V_3$ operating at 0.95 pu, a 20 MW increase in the transfer capability can be achieved by increasing $P_c$ from 0 to 10 MW. Conversely, by circulating the power form the series VSC 108 to the shunt VSC 106, the power transfer capability will be decreased. In the $P_{load}$ range shown on the X-axis of FIG. 4, the series VSC 108 is saturated at its 50 MVA limit, and the shunt VSC 106 does not saturate until the load active power reaches about 570 MW, as noted by the "corner" points on the PV curves close to that value. The saturation of the STATCOM can also be observed in FIG. 4 as $V_2$ is maintained at 1.03 pu until about 570 MW.

The sets of PV curves in FIGS. 4 and 5 are useful in dispatching a UPFC or other FACTs devices having coupled VSCs. For example, a good dispatch strategy is to use $P_c=-5$ MW to keep $V_3$ at about 1 pu when $P_{load}$ is below 570 MW.

For $P_{load}$ beyond 570 MW, the circulating power $P_c$ can be increased up to $P_c=10$ MW, when it is no longer possible to maintain $V_3$ at 1 pu. In the meantime, the voltage stability margin can be monitored to determine whether load reduction action is required.

The PV curves described above can be used by a system operator to provide maximum power transfer while maintaining voltage stability on one or more buses in a power system. In some embodiments, the operator can read the appropriate value from a PV curve and enter a circulating power demand $P_c$ (e.g., via a keyboard), which can be used by an automatic power flow controller to inject the appropriate amounts of injection voltages $\vec{V}_{m1}$, $\vec{V}_{m2}$ and/or to achieve maximum power transfer with voltage stability while one or both of the VSCs 106, 108, are operating at their rated capacity. In other embodiments, PV curves can be stored in look-up tables or other data structures, which are indexed by a supervisory computer in response to a limit computer detecting that one or both VSCs are operating at rated capacity, and then automatically commanding a particular circulating power $P_c$ without operator intervention using a UPFC controller.

While the circulation power dispatch strategy discussed above can be used to generate useful graphs (e.g., PV curves) for operators and planners as discussed with respect to FIGS. 3–5, the circulation power dispatch strategy can also be used in power flow controllers to provide automatic power flow control under constrained conditions while maintaining a desired voltage stability.

Automatic Power Flow Control Using Circulating Power

Figure 6:
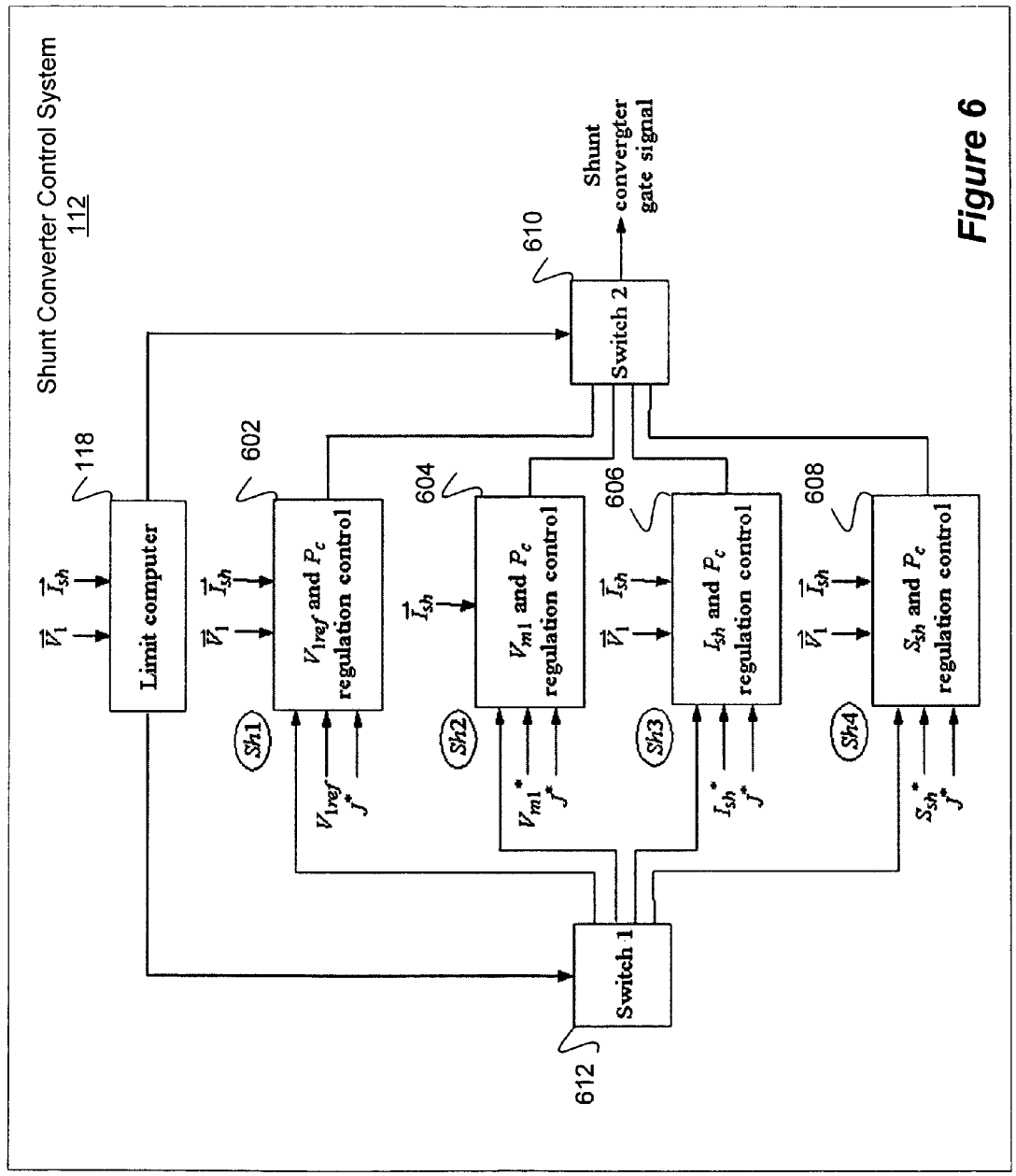
FIG. 6 is a block diagram of an embodiment of a shunt converter control system.

FIG. 6 is a block diagram of an embodiment of a shunt converter control system 112. The shunt converter control system 112 includes a limit computer 118, shunt converter regulation control blocks 602, 604, 606, 608, and switches 610, 612. The control blocks 602, 604, 606, 608, can be implemented in software and/or hardware as separate control blocks (as shown) or in a single controller.

The limit computer 118 determines if the shunt VSC 106 is operating at a certain operating limit and selects the appropriate control block 602, 604, 606, 608, for providing gate signals via switch 610. A command signal 603 from the limit computer 118 coupled to the switch 612 is used to enable one of the control blocks 602, 604, 606, 608, and a command signal 605 from the limit computer 118 to the switch 610 is used to enable only the gate signals provided by the selected control block to be passed to the shunt VSC 106. Each regulation control block 602, 604, 606, 608, implements a control strategy, depending on the limit violation scenario. For example, if there is no limit violation for the shunt VSC 106, the $V_{1ref}$ and $P_c$ regulation control block (Sh1) 602 is activated. If the shunt VSC 106 is operating at the maximum voltage magnitude limit, the $V_{m1}$ and $P_c$ regulation control block (Sh2) 604 is activated. Similarly, if the shunt VSC 106 is operating at the current magnitude limit or the MVA limit, the $I_{sh}$ and $P_c$ regulation control block (Sh3) 605 or the $S_{sh}$ and $P_c$ regulation control block (Sh4) 608 is activated, respectively. Note that the shunt converter control system 112 can include more or fewer control blocks, as needed, depending upon the configuration of the power network and the limit violations to be monitored.

Figure 7:
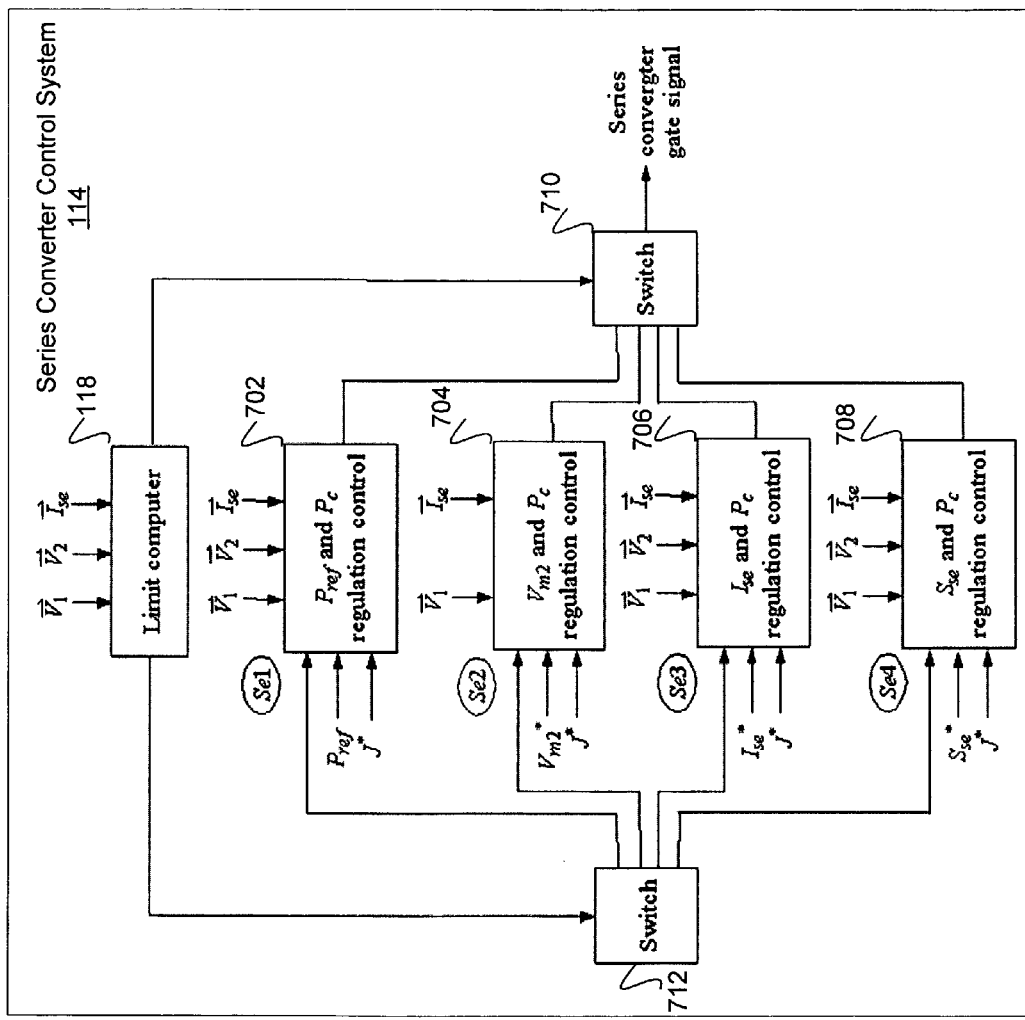
FIG. 7 is a block diagram of an embodiment of a series converter control system.

FIG. 7 is a block diagram of an embodiment of a series converter control system 114. Similar to the shunt converter control system 112, a limit computer 118 determines an active series control strategy according to a limit violation condition, and switches 710, 712, are used to activate the regulation control blocks 702, 704, 706, 708, for providing the appropriate gate signals to the series VSC 108. For example, if the series VSC 108 is operating under the limits, the $P_{ref}$ and $P_c$ regulation control block (Se1) 702 is activated. If the series VSC 108 is operating at the voltage limit, current limit, or the MVA limit, the $V_{m2}$ and PC regulation control block (Se2) 604, the $I_{se}$ and $P_c$ regulation control block (Se3) 606 or the $S_{se}$ and $P_c$ regulation control block (Se4) 608 is activated, respectively. Note that the series converter control system 114 can include more or fewer control blocks, as needed, depending upon the configuration of the power network and the limit violations to be monitored.

Shunt Converter Regulation Control Blocks

Figure 8:
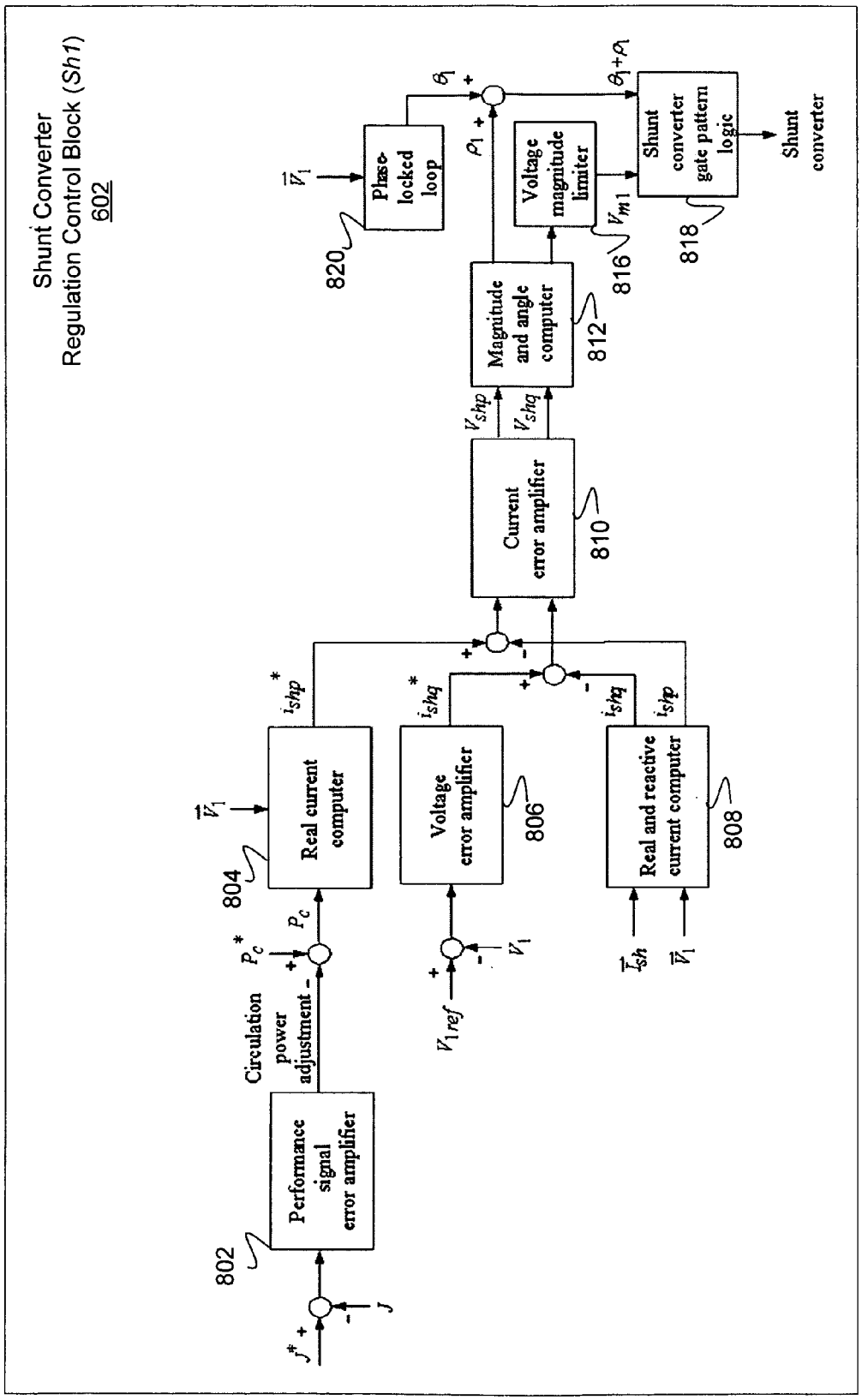
FIG. 8 is a block diagram of an embodiment of the shunt converter $V_{1ref}$ and $P_c$ regulation control block (Sh1).

FIG. 8 is a block diagram of an embodiment of the shunt converter $V_{1ref}$ and $P_c$ regulation control block (Sh1) 602. The control block 602 includes a performance signal error amplifier 802, a real current computer 804, a voltage error amplifier 806, a real and reactive current computer 808, a current error amplifier 810, a magnitude and angle computer 812, a voltage magnitude limiter 816, a shunt converter gate pattern logic 818 and a phase locked loop 820.

In some embodiments, the regulation control block 602 uses a synchronous reference frame established with the phase-locked loop 820 to produce a reference phase angle $\theta_1$, which is the phase angle of the UPFC from-bus voltage $\vec{V}_1$. The circulation power $P_c$ is regulated to ultimately achieve the desired value of a performance variable J, which can be the voltage on a particular bus, the weighted average voltage value of a number of buses, or the reactive power flow on a line. The performance signal error amplifier 802 is configured to accommodate the error in the variable J due to the difference of the real system and a model of the system (e.g., PV curves). The output of the performance signal error amplifier 802 is an incremental circulation power component, which is added to the circulation power setpoint $P_c^*$. In some embodiments, the setpoint $P_c^*$ is computed based on a model of the system, which in practice may not be exactly the same as the real power network. The incremental adjustment will ensure that the variable J will be achieved without error. The regulation of $V_{1ref}$ and $P_c$ is achieved by controlling the shunt current $I_{sh}$. The desired real shunt current $i_{shp}^*$ is computed from the real current computer 804 using the equation $$i_{shp}^* = P_c/V_1, \quad (24)$$

where $V_1$ is the measured from-bus voltage magnitude. The reference of reactive shunt current $i_{shq}^*$, however, is generated from the voltage error amplifier 806 to achieve the setpoint $V_{1ref}$. The desired real currents $i_{shp}^*$ and reactive current $i_{shq}^*$ are compared against the measured real and reactive current values $i_{shp}$ and $i_{shq}$, respectively, and the error is imported into the current error amplifier 810 to drive the active and reactive shunt voltage component $V_{shp}$ and $V_{shq}$, which provide the shunt converter voltage magnitude $V_{m1}$ and angle $\rho_1$ with respect to the from bus voltage $\vec{V}_1$ using the magnitude and angle computer 812. Because the real and reactive power components p–q are calculated with respect to the from-bus voltage $\vec{V}_1$, the resulting voltage angle $\rho_1$ is added to the from-bus voltage angle $\theta_1$ before generating the proper gate signals using shunt converter gate pattern logic 818. Note that the voltage magnitude limiter 816 ensures that the voltage output $V_{m1}$ does not exceed the voltage magnitude limit at the present control step. If the voltage magnitude reaches the limit, then in the next control step the limit computer 118 will select the control strategy to enforce the $V_{m1}$ setpoint at the limit value.

Figure 9:
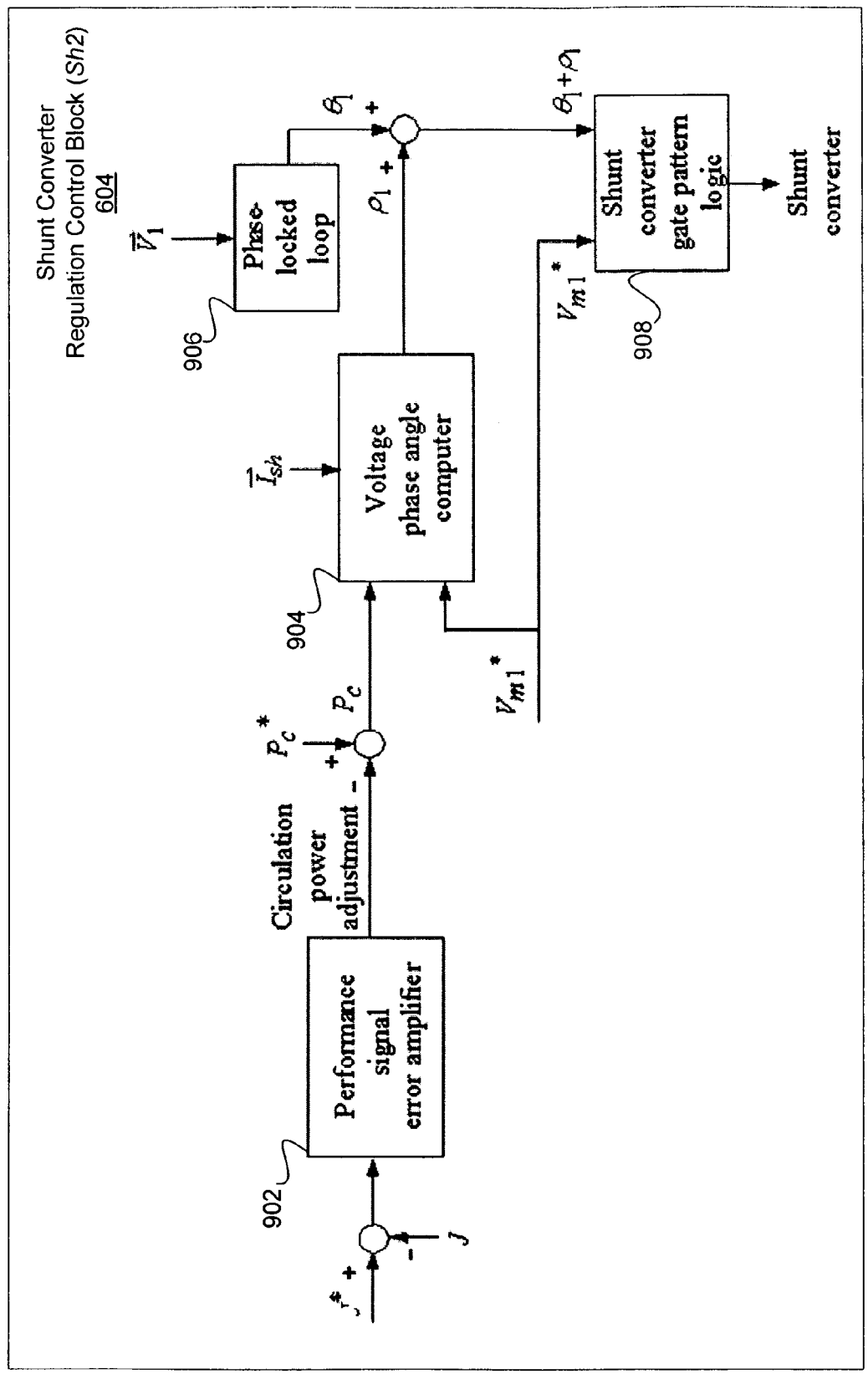
FIG. 9 is a block diagram of an embodiment of a shunt converter $V_{m1}$ and $P_c$ regulation control block (Sh2).

FIG. 9 is a block diagram of an embodiment of a shunt converter $V_{m1}$ and $P_c$ regulation control block (Sh2) 604. The control block 604 includes a performance signal error amplifier 902, a voltage phase angle computer 904, a phase locked loop 906 and a shunt converter gate pattern logic 908.

In this control strategy, $V_{m1}^*$ can either be the maximum voltage limit or specified by the operator to achieve a fixed voltage injection operation. With the desired voltage magnitude $V_{m1}^*$, the voltage angle $\rho_1$ can be directly calculated by the voltage phase angle computer 904 using the equation:

$$P_c = -V_{m1}^* I_{sh} \cos(\rho_1 - \rho_{ish}), \quad (25)$$

where $I_{sh}$ is the measured shunt current magnitude and $\vec{\rho}_{ish}$ is the current angle with respect to the from bus voltage $\vec{V}_1$. The voltage angle $\rho_1$ computed from equation (23) does not include the operating losses of the shunt VSC 106. However, the performance signal error amplifier 902 will compensate the errors in performance variable J. The voltage angle $\rho_1$ computed from equation (25) is added to the from-bus voltage angle $\theta_1$ from the phase-locked loop 906. The sum of these angles and the desired voltage magnitude $V_{m1}^*$ are provided to the shunt converter gate logic 908 to provide the appropriate gate signals to the shunt VSC 106.

Figure 10:
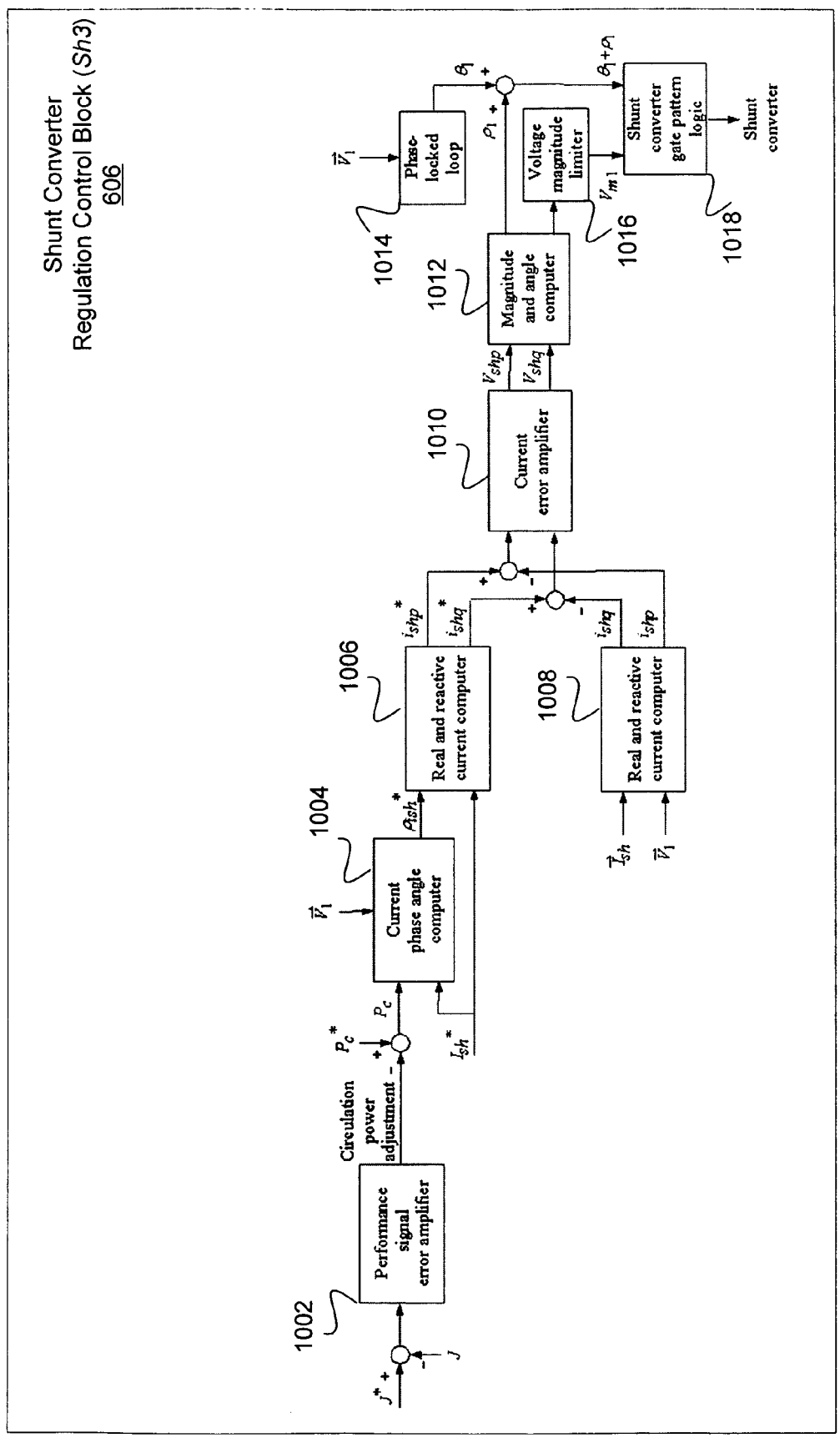
FIG. 10 is a block diagram of an embodiment of a shunt converter $I_{sh}$ and $P_c$ regulation control block (Sh3).

FIG. 10 is a block diagram of an embodiment of a shunt converter $I_{sh}$ and $P_c$ regulation control block (Sh3) 606. The control block 606 includes a performance signal error amplifier 1002, a current phase angle computer 1004, real and reactive current computers 1006, 1008, a current error amplifier 1010, a magnitude and angle computer 1012, a phase-locked loop 1014, a voltage magnitude limiter 1016 and a shunt converter gate pattern logic 1018.

In some embodiments, the current magnitude reference $I_{sh}^*$ can be either the maximum current limit or a specification from the operator. With the reference shunt current magnitude $I_{sh}^*$ and circulation power $P_c$, the desired current phase angle $\rho_{ish}^*$ can be calculated with respect to the from-bus voltage by the current phase angle computer 1004 using the equation $$P_c = -V_1 I_{sh}^* \cos \rho_{ish}^*, \quad (26)$$

where $V_1$ is the measured from-bus voltage magnitude. From $I_{sh}$ and $\rho_{ish}^*$, the real and reactive current components $i_{shp}^*$ and $i_{shq}^*$ can be computed by the real and reactive current computer 1006 and compared with the measured shunt real and reactive currents $i_{shp}$ and $i_{shq}$ computed by the real and reactive current computer 1008, to drive the shunt converter voltage. Although equation (26) neglects operating losses, the error in shunt current will be compensated by the current error amplifier 1010. The performance signal error amplifier 1002, magnitude and angle computer 1012, phase-locked loop 1014, voltage magnitude limiter 1016 and shunt converter gate pattern logic 1018 operate as previously described with respect to FIG. 8.

Figure 11:
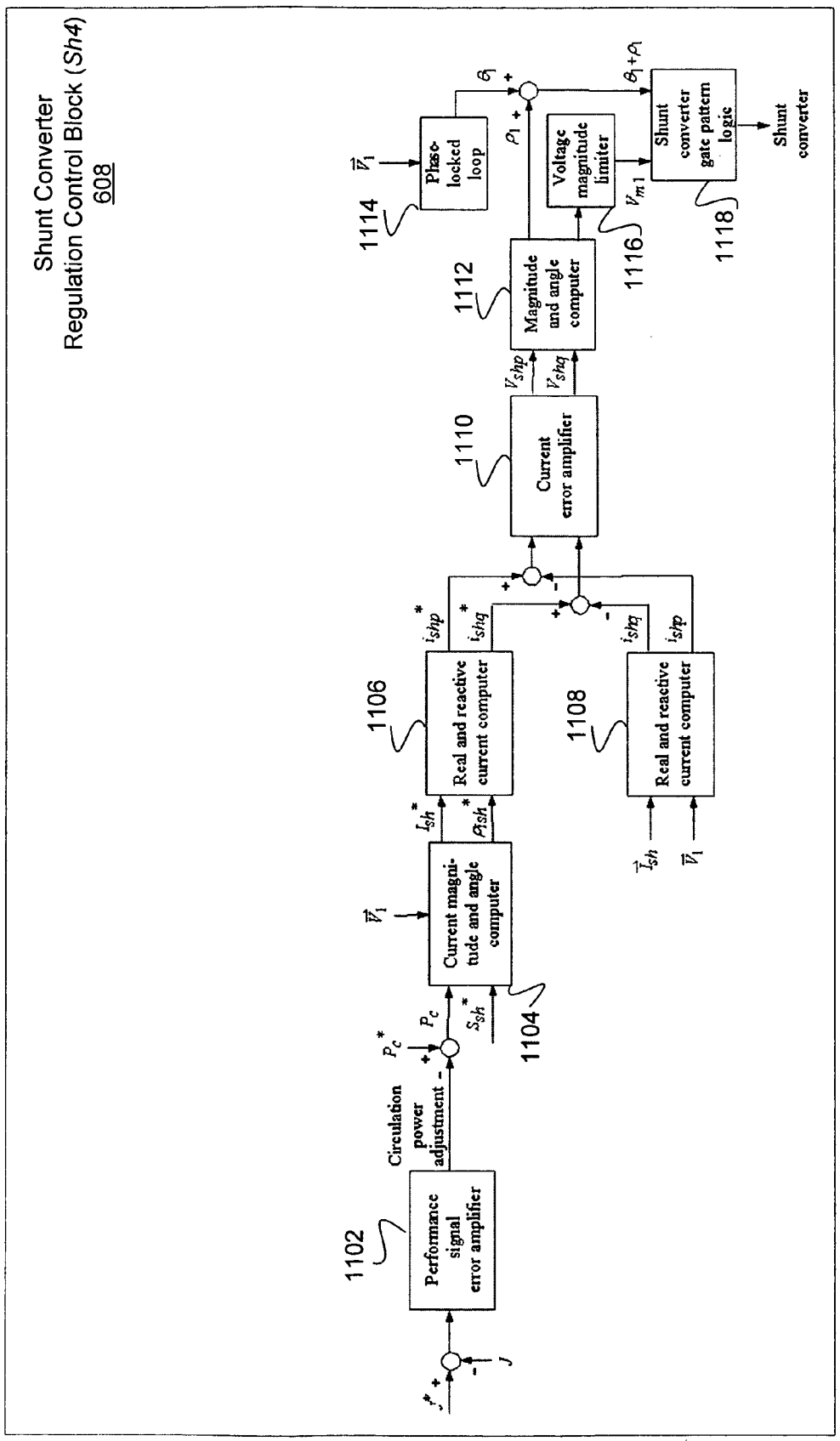
FIG. 11 is a block diagram of an embodiment of a shunt converter $S_{sh}$ and $P_c$ regulation control block (Sh4).

FIG. 11 is a block diagram of an embodiment of a shunt converter $S_{sh}$ and $P_c$ regulation control block (Sh4) 608. The control block 608 includes a performance signal error amplifier 1102, a current magnitude and angle computer 1104, real and reactive current computers 1106, 1108, a current error amplifier 1110, a magnitude and angle computer 1112, a phase-locked loop 1114, a voltage magnitude limiter 1116, and a shunt converter gate pattern logic 1118.

From the desired MVA output $S_{sh}^*$ and the circulation power $P_c$, the current angle and magnitude computer 1104 can compute the desired shunt current magnitude $I_{sh}^*$ and current angle $\rho_{ish}^*$ with respect to the from bus voltage by $$I_{sh}^* = S_{sh}^*/V_1$$

$$P_c = I_{sh}^* V_1 \cos \rho_{ish}^*, \tag{27}$$

where $V_1$ is the measured from-bus voltage magnitude. Although equation (27) neglects operating losses, the error in the current will be compensated by the current error amplifier 1110. The performance signal error amplifier 1102, real and reactive current computers 1106, 1108, magnitude and angle computer 1112, phase-locked loop 1114, voltage magnitude limiter 1116 and shunt converter gate pattern logic 1118 operate as previously described with respect to FIG. 10.

Series Converter Regulation Control Blocks

Figure 12:
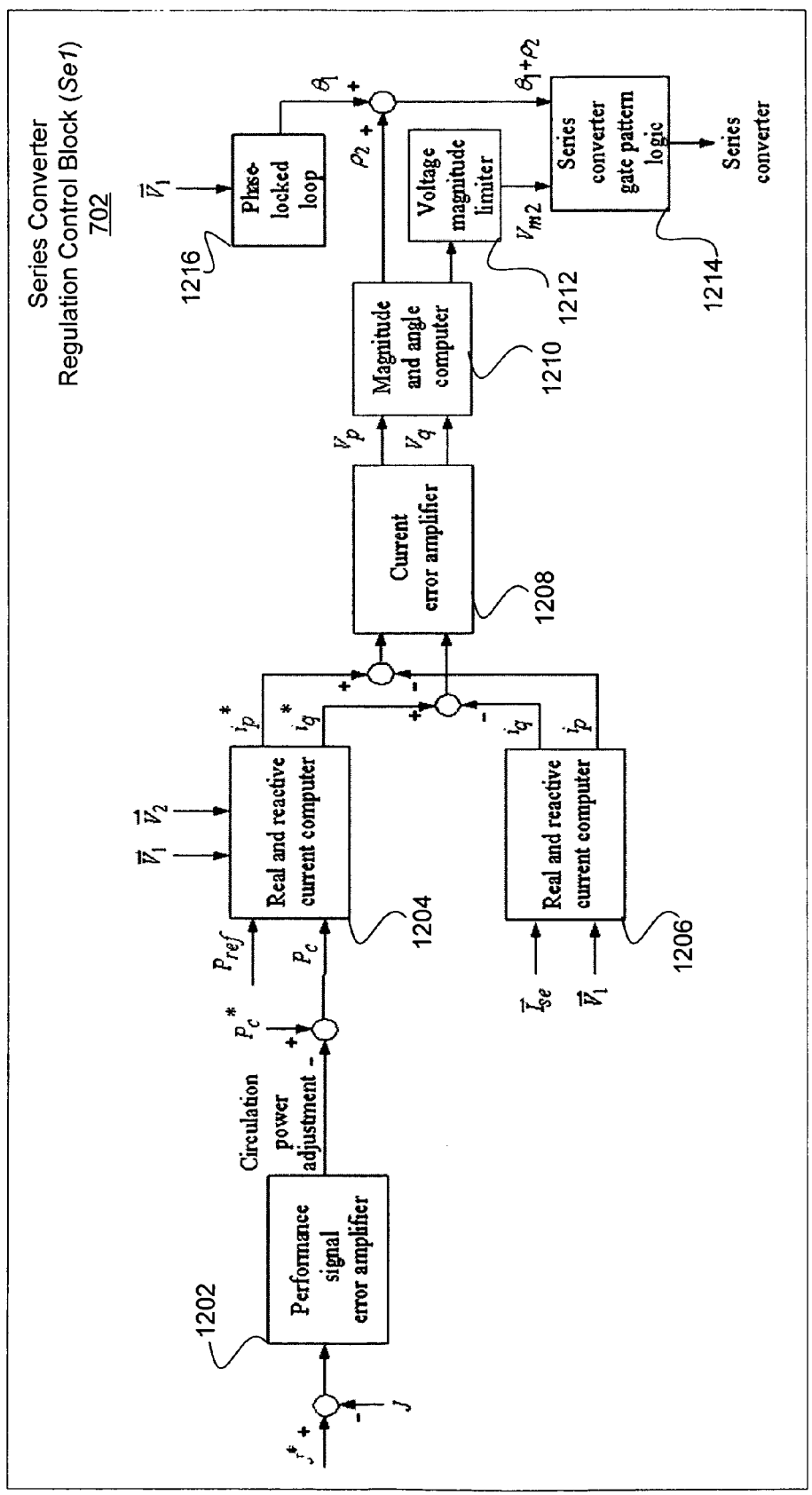
FIG. 12 is a block diagram of an embodiment of a series converter $P_{ref}$ and $P_c$ regulation control block (Se1).

FIG. 12 is a block diagram of an embodiment of a series converter $P_{ref}$ and $P_c$ regulation control block (Se1) 702. The control block 702 includes a performance signal error amplifier 1202, real and reactive current computers 1204, 1206, a current error computer 1208, a magnitude and angle computer 1210, a voltage magnitude limiter 1212, a phase-locked loop 1216, and a series converter gate pattern logic 1214.

The desired real the reactive current components $i_p^*$ and $i_q^*$ with respect to the from-bus voltage $\vec{V}_1$ are determined using the real and reactive current computer 1204 and the setpoints $P_{ref}$ and $P_c$ by:

$$\begin{bmatrix} i_p^* \\ i_q^* \end{bmatrix} = \begin{bmatrix} V_1 & 0 \\ V_2\cos(\theta_2 - \theta_1) & V_2\sin(\theta_2 - \theta_1) \end{bmatrix} \begin{bmatrix} P_{ref} - P_c \\ P_{ref} \end{bmatrix}, \tag{28}$$

where $V_1 e^{j\theta_1}$ and $V_2 e^{j\theta_2}$ are the measured complex voltages of the from-bus and to-bus, respectively. The desired real and reactive currents $i_p^*$ and $i_q^*$ are compared with the measured real and reactive currents $i_p$ and $i_q$ provided by the real and reactive computer 1206 to drive the series voltages $V_p$ and $V_q$, which are received by the magnitude and angle computer 1210. The magnitude and angle computer 1210 provides the voltage magnitude $V_{m2}$ and angle $\rho_2$. The voltage angle $\rho_2$ is added to the from-bus voltage angle $\theta_1$ generated by the phase-locked loop 1214 because the series p-q components are also calculated with respect to the from-bus voltage. Note that the voltage magnitude limiter 1212 ensures that the voltage output $V_{m2}$ does not exceed the voltage magnitude limit at the present control step. If $V_{m2}$ reaches the limit in the next control step, the limit computer 118 will select the control strategy to enforce the $V_{m1}$ setpoint at the limit value.

Figure 13:
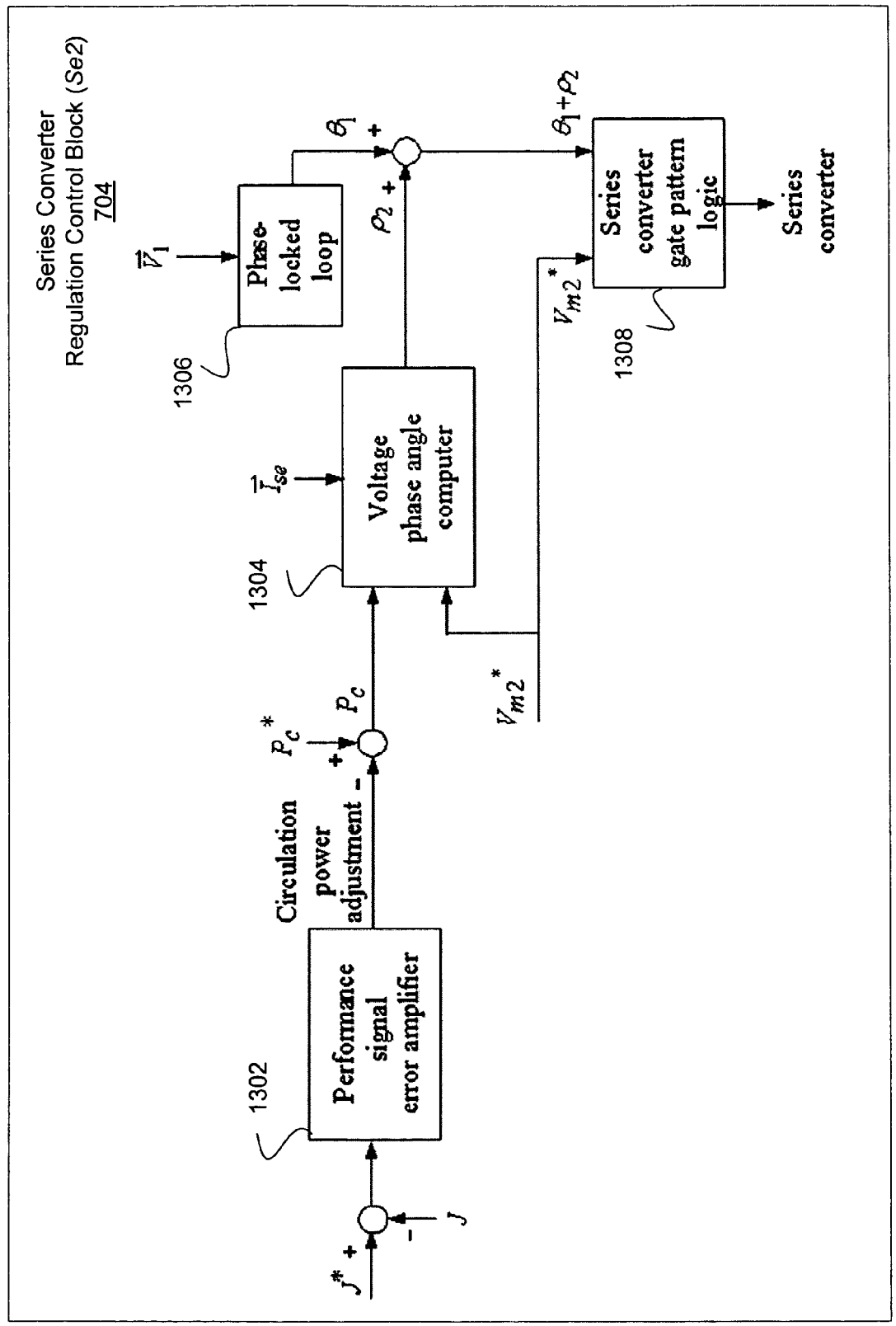
FIG. 13 is a block diagram of an embodiment of a series converter $V_{m2}$ and $P_c$ regulation control block (Se2).

FIG. 13 is a block diagram of an embodiment of a series converter $V_{m2}$ and $P_c$ regulation control block (Se2) 704. The control block 704 includes a performance signal error amplifier 1302, a voltage phase angle computer 1304, a phase-locked loop 1306 and a series converter pattern logic 1308.

In some embodiments, the reference $V_{m2}^*$ can be either the maximum voltage limit or a specification from the operator to achieve a fixed series voltage injection operation, which is a useful operation mode especially in post-contingencies. With reference $V_{m2}^*$, the voltage angle $\rho_2$ can be directly calculated from $$P_c = -V_{m2}^* I_{se} \cos(\rho_2 - \rho_{ise}), \tag{29}$$

where $I_{se}$ is the measured current magnitude and $\rho_{ise}$ is the current angle with respect to the from bus voltage. Although the voltage angle $\rho_2$ computed by the voltage phase angle computer 1304 using equation (29) does not include operating losses of the series converter VSC 108, the performance signal error amplifier 1302 will compensate errors in performance variable J. The phase-locked loop 1306 and the series converter gate pattern logic 1308 operate as previously described.

Figure 14:
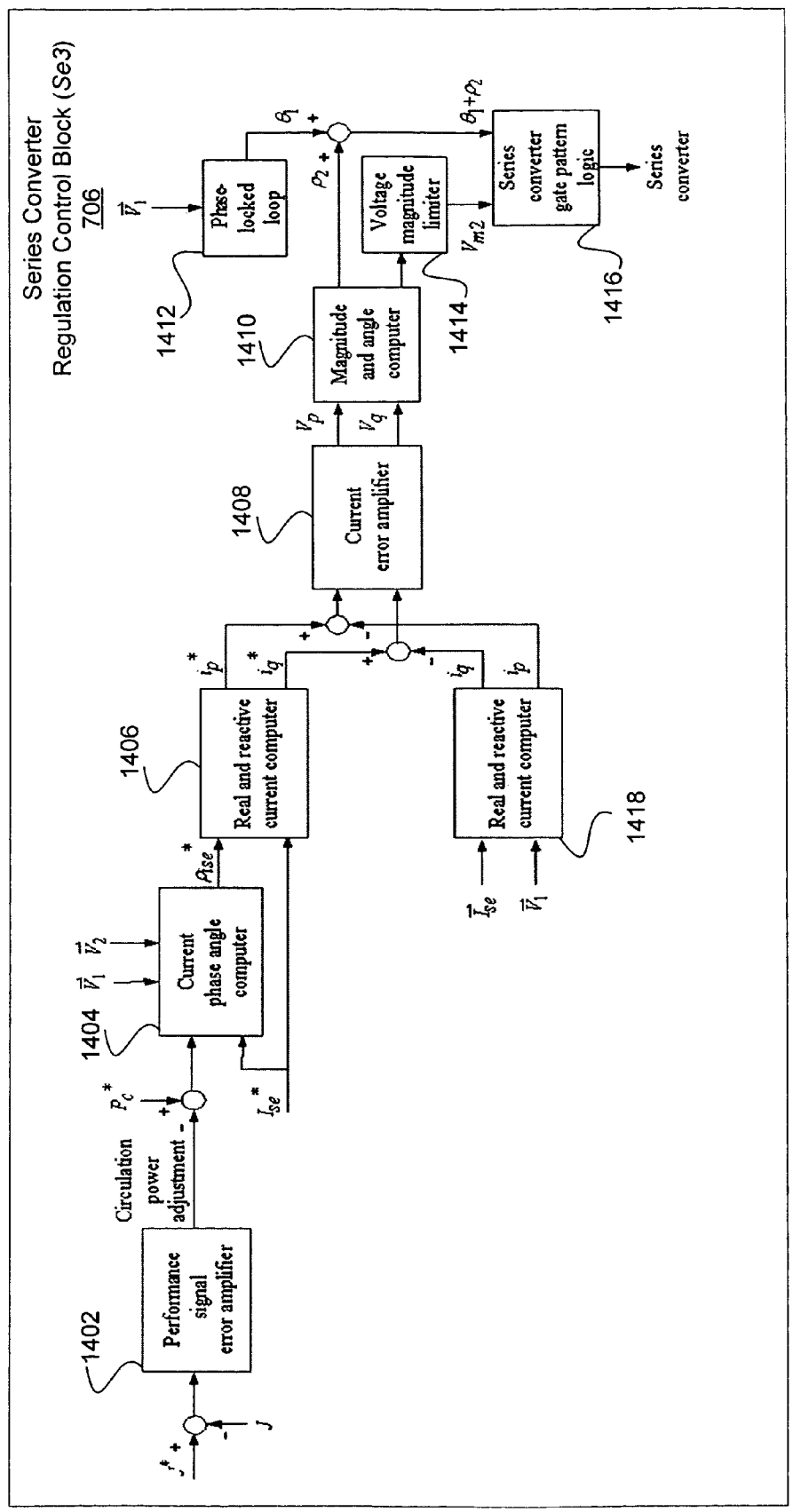
FIG. 14 is a block diagram of an embodiment of a series converter $I_{se}$ and $P_c$ regulation control block (Se3).

FIG. 14 is a block diagram of an embodiment of a series converter $I_{se}$ and $P_c$ regulation control block (Se3) 706. The control block 706 includes a performance signal error amplifier 1402, a current phase angle computer 1404, real and reactive current computers 1406, a current error amplifier 1408, a magnitude and angle computer 1410, a phase-locked loop 1412, a voltage magnitude limiter 1414 and a series converter gate pattern logic 1416.

In some embodiments, the current magnitude reference $I_{se}^*$ can either be the maximum current limit or specified from an operator. With the desired series current magnitude $I_{se}^*$ and the circulation power $P_c$, the desired current phase angle $\rho_{ise}$ can be calculated with respect to from-bus voltage using $$P_c = V_2 I_{se}^* \cos(\theta_2 - \theta_1 - \rho_{ise}) - V_1 I_{se}^* \cos \rho_{ise}^*, \tag{30}$$

where $V_1$ is the measured from-bus voltage magnitude, and $V_2$ and $\theta_2$ are the measured to-bus voltage magnitude and angle, respectively. From the desired $I_{se}^*$ and $\rho_{ise}^*$, the real and reactive currents $i_p^*$ and $i_q^*$ can be computed by the real and reactive current computer 1406 and compared against the measured shunt currents $i_p$ and $i_q$ provided by the real and reactive current computer 1418 to drive the series voltages $V_p$ and $V_q$, yielding the voltage magnitude $V_{m2}$ and angle $\rho_2$. The performance signal error generator 1402, the current phase angle computer 1404, the current error amplifier 1408, the magnitude and angle computer 1410, the phase-locked loop 1412, the voltage magnitude limiter 1414 and the series converter gate pattern logic 1416 operate as previously described with respect to FIG. 12.

Figure 15:
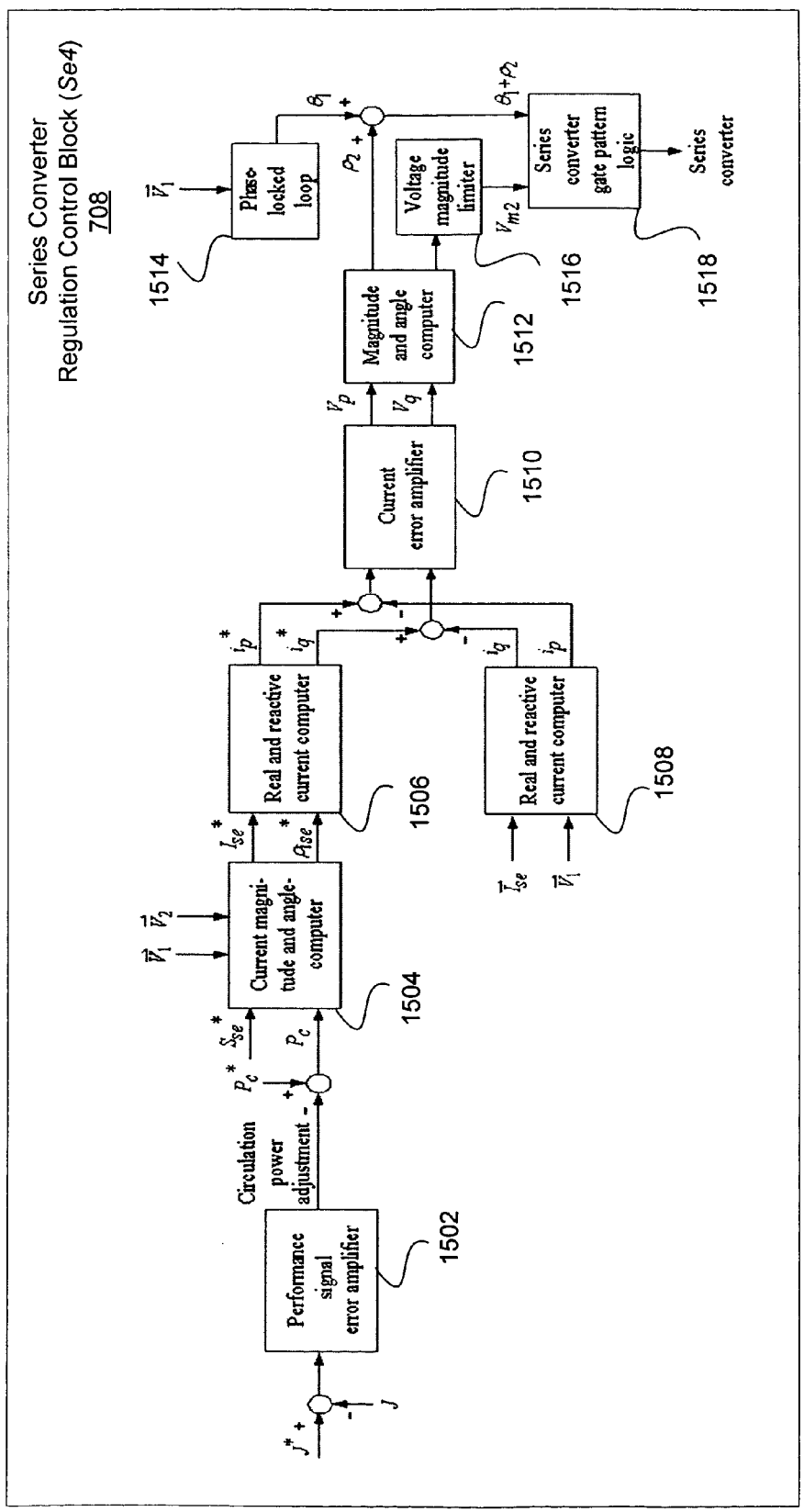
FIG. 15 is a block diagram of an embodiment of a series converter $S_{se}$ and $P_c$ regulation control block (Se4).

FIG. 15 is a block diagram of an embodiment of a series converter $S_{se}$ and $P_c$ regulation control block (Se4) 708. The control block 708 includes a performance signal error amplifier 1502, a current magnitude and angle computer 1504, real and reactive current computers 1506,1508, a current error amplifier 1510, a magnitude and angle computer 1512, a phase-locked loop 1514, a voltage magnitude limiter 1516, and a series converter gate pattern logic 1518.

From the desired series MVA output $S_{se}^*$ and the circulation power $P_c$, the desired series current magnitude $I_{se}^*$ and angle $\rho_{ise}^*$ is provided by the current magnitude and angle computer 1504, which implements the equations $$P_c = V_2 I_{se}^* \cos(\theta_2 - \theta_1 - \rho_{ise}^*) - V_1 I_{se}^* \cos \rho_{ise}^*$$

$$\sqrt{S_{se}^{*2} - P_c^2} = V_2 I_{se}^* \sin(\theta_2 - \theta_1 - \rho_{ise}^*) - V_1 I_{se}^* \sin \rho_{ise}^*, \tag{31, 32}$$

where $V_1 e^{j\theta_1}$ and $V_2 e^{j\theta_2}$ are the measured voltages of UPFC from-bus and to-bus, respectively. The performance signal error amplifier 1502, the real and reactive current computers 1506, 1508, the current error amplifier 1510, the magnitude and angle computer 1512, the phase-locked loop 1514, the voltage magnitude limiter 1516, and the series converter gate pattern logic 1518 operate as previously described with respect to FIG. 14.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the invention and its practical applications, to thereby enable others skilled in the art to best utilize the invention and various embodiments with various modifications as are suited to the particular use contemplated.

Appendix A

Jacobian Matrix For UPFC

For the UPFC model shown in FIG. 2, the active and reactive power injections due to the UPFC are $$P_{sh} = -V_{m1}V_1 \sin(\theta_1 - \alpha_1)/X_{t1}$$

$$Q_{sh} = V_1(V_{m1}\cos(\theta_1 - \alpha_1) - V_1)/X_{t1}$$

$$P_{sefrom} = -V_{m2}V_1 \sin(\theta_1 - \alpha_2)/X_{t2}$$

$$Q_{sefrom} = V_{m2}V_1 \cos(\theta_1 - \alpha_2)/X_{t2}$$

$$P_{seto} = V_{m2}V_2 \sin(\theta_2 - \alpha_2)/X_{t2}$$

$$Q_{seto} = -V_{m2}V_2 \cos(\theta_2 - \alpha_2)/X_{t2}$$

$$P_{se} = P_{sefrom} + P_{seto} \quad (A.1)$$

where $P_{sh}$, $Q_{sh}$ are the power injections into the UPFC from-bus due to the shunt VSC. $P_{sefrom}$ and $Q_{sefrom}$ are the power injections into the from-bus due to the series VSC; $P_{seto}$ and $Q_{seto}$ are the power injections into the UPFC to-bus due to the series VSC. $P_{se}$ is the active power generation of the series VSC.

From equation (A.1), a perturbation analysis can be performed to calculate the additional elements in the augmented loadflow Jacobian:

$$\Delta P_{sh} = \frac{P_{sh}}{V_1}\Delta V_1 + \frac{P_{sh}}{V_{m1}}\Delta V_{m1} - \left(Q_{sh} + \frac{V_1^2}{X_{t1}}\right)(\Delta\theta_1 - \Delta\alpha_1) \quad (A.2)$$

$$\Delta Q_{sh} = \left(Q_{sh} - \frac{V_1^2}{X_{t1}}\right)\frac{\Delta V_1}{V_1} + \left(Q_{sh} + \frac{V_1^2}{X_{t1}}\right)\frac{\Delta V_{m1}}{V_{m1}} + P_{sh}(\Delta\theta_1 - \Delta\alpha_1)$$

$$\Delta P_{sefrom} = \frac{P_{sefrom}}{V_1}\Delta V_1 + \frac{P_{sefrom}}{V_{m2}}\Delta V_{m2} - Q_{sefrom}(\Delta\theta_1 - \alpha_2)$$

$$\Delta Q_{sefrom} = \frac{Q_{sefrom}}{V_1}\Delta V_1 + \frac{Q_{sefrom}}{V_{m2}}\Delta V_{m2} + P_{sefrom}(\Delta\theta_1 - \Delta\alpha_2)$$

$$\Delta P_{seto} = \frac{P_{seto}}{V_2}\Delta V_2 + \frac{P_{seto}}{V_{m2}}\Delta V_{m2} - Q_{seto}(\Delta\theta_2 - \Delta\alpha_2)$$

$$\Delta Q_{seto} = \frac{Q_{seto}}{V_2}\Delta V_2 + \frac{Q_{seto}}{V_{m2}}\Delta V_{m2} + P_{seto}(\Delta\theta_2 - \Delta\alpha_2)$$

$$\Delta P_{se} = \Delta P_{sefrom} + \Delta P_{seto}$$

In practice, the direct and quadrature series voltages are used, rather than the voltage magnitude and angle. The direct and quadrature voltages are defined as $$V_{md} = V_{m2}\cos(\alpha_2)$$

$$V_{mq} = V_{m2}\sin(\alpha_2) \quad (A.3)$$

This transformation of the variables avoids any ambiguity associated with the circular periodicity of the voltage angle. In terms of (A.3), the Jacobian matrix elements are modified to $$\Delta P_{sefrom} = \frac{P_{sefrom}}{V_1}\Delta V_1 - Q_{sefrom}\Delta\theta_1 + \quad (A.4)$$
$$V_1(\sin\theta_1 \Delta V_{md} - \cos\theta_1 \Delta V_{mq})/X_{t2}$$

$$\Delta Q_{sefrom} = \frac{Q_{sefrom}}{V_1}\Delta V_1 + P_{sefrom}\Delta\theta_1 +$$
$$V_1(\cos\theta_1 \Delta V_{md} + \sin\theta_1 \Delta V_{mq})/X_{t2}$$

$$\Delta P_{seto} = \frac{P_{seto}}{V_2}\Delta V_2 - Q_{seto}\Delta\theta_2 +$$
$$V_2(\sin\theta_2 \Delta V_{md} - \cos\theta_2 \Delta V_{mq})/X_{t2}$$

$$\Delta Q_{seto} = \frac{Q_{seto}}{V_2}\Delta V_2 + P_{seto}\Delta\theta_2 -$$
$$V_2(\cos\theta_2 \Delta V_{md} + \sin\theta_2 \Delta V_{mq})/X_{t2}$$

When no saturation occurs for the UPFC, the default loadflow equations $f_{VSC}$ are (3a,b,c,d) and the corresponding Jacobian matrix terms for $f_{VSC}$ in (7) are $\Delta V_1$, $\Delta P_{seto}$ in (A.4), $\Delta Q_{seto}$ in (A.4), and $\Delta P_{sh} + \Delta P_{se}$ in (A.2), with each representing one row of the Jacobian matrix. When the UPFC is operating at rated capacity, the Jacobian terms for $f_{VSC}$ in (7) need to be modified accordingly, as discussed below.

If only the shunt VSC operates at the rated capacity and the series VSC is not, the loadflow equations are (3b), (18), (19), and the limit equation of the shunt VSC, such as (20) or (22). The Jacobian matrix terms for $f_{VSC}$ are the four rows corresponding to $\Delta P_{seto}$ (A.4), $\Delta P_{sh}$ (A.2), $\Delta P_{se}$ (A.2), and the limit equation Jacobian $\Delta S_{sh}$, $\Delta V_{m1}$, or $\Delta I_{sh}$, depending on the limit equation, where $$\Delta S_{sh} = (P_{sh}\Delta P_{sh} + Q_{sh}\Delta Q_{sh})/\sqrt{P_{sh}^2 + Q_{sh}^2}, \quad (A.5)$$

$$\Delta I_{sh} = \frac{(V_1 - V_{m1}\cos(\theta_1 - \alpha_1))\Delta V_1 +}{I_{sh}X_{t1}^2} \quad (A.6)$$
$$\frac{(V_{m1} - V_1\cos(\theta_1 - \alpha_1))\Delta V_{m1} - P_{sh}X_{t1}(\Delta\theta_1 - \Delta\alpha_1)}{I_{sh}X_{t1}^2}$$

If only the series VSC operates at the rated capacity and the shunt VSC is not, the loadflow equations are (3a), (18), -(19), and the limit equation of the series VSC, such as (16) or (23). The Jacobian matrix terms for $f_{CSC}$ are the four rows corresponding to $\Delta V_1$, $\Delta P_{sh}$ (A.2), $\Delta P_{se}$ (A.2), and the limit equation Jacobian $\Delta S_{se}$, $\Delta V_{m2}$ or $\Delta I_{se}$, depending on the limit equation, where $$\Delta S_{se} = \frac{(P_{se}\Delta P_{se} + Q_{se}\Delta Q_{se})}{\sqrt{P_{se}^2 + Q_{se}^2}}, \quad (A.7)$$

-continued $$\Delta V_{m2} = \frac{V_{md}}{V_{m2}}\Delta V_{md} + \frac{V_{mq}}{V_{m2}}\Delta V_{mq} \quad (A.8)$$

$$\Delta I_{se} = \frac{1}{I_{se}X_{t2}^2}((V_1 - V_2\cos(\theta_1 - \theta_2)) - V_{md}\cos\theta_1 - \quad (A.9)$$
$$V_{mq}\sin\theta_1)\Delta V_1 + (V_2 - V_1\cos(\theta_1 - \theta_2) + V_{md}\cos\theta_2 +$$
$$V_{mq}\sin\theta_2)\Delta V_2 + (V_1V_2\sin(\theta_1 - \theta_2) + V_1V_{md}\sin\theta_1 -$$
$$V_1V_{mq}\cos\theta_1)\Delta\theta_1 + (-V_1V_2\sin(\theta_1 - \theta_2) -$$
$$V_2V_{md}\sin\theta_2 + V_2V_{mq}\cos\theta_2)\Delta\theta_2 + (V_{md} - V_1\cos\theta_1 +$$
$$V_2\cos\theta_2)\Delta V_{md} + (V_{mq} - V_1\sin\theta_1 + V_2\sin\theta_2)\Delta V_{mq})$$

If both shunt VSC and series VSC operate at the rated capacity, the loadflow equations are (18), (19), and the corresponding limit equations of the shunt VSC and the series VSC. The Jacobian matrix terms for $f_{VSC}$ are the four rows corresponding to $\Delta P_{sh}$ (A.2), and $\Delta P_{se}$ (A.2), and the proper limit equation Jacobian, such as $\Delta S_{sh}$ (A.5) and $\Delta S_{se}$ (A.7), or $\Delta I_{sh}$ (A.6) and $\Delta V_{m2}$ (A.8).

Note that in the Jacobian matrix (7) the upper rows for $f_P$ and $f_Q$ do not change when the dispatch strategy switches due to the saturation. However, for the Jacobian terms with respect to the bus active power injections $f_P$, the active powers $\Delta P_{sh}+\Delta P_{sefrom}$ and $\Delta P_{seto}$ injected by the UPFC should be inserted in the rows corresponding to the UPFC from bus and to bus, respectively. Similarly, for the Jacobian matrix terms related to $f_Q$, the reactive power $\Delta Q_{sh}+\Delta Q_{sefrom}$ and $\Delta Q_{seto}$ injected by the UPFC should be inserted in the rows corresponding to the UTPFC from bus and to bus, respectively.

What is claimed is:

1. A power flow controller, comprising:
a controller responsive to a circulating power demand;
a first voltage-sourced converter coupled to the controller and adapted to be coupled to a transmission line, the first voltage-sourced converter configured by the controller to control power flow in the transmission line; and
a second voltage-sourced converter coupled to the first voltage-sourced converter via a direct current link and adapted to be coupled to the transmission line, the second voltage-sourced converter configured by the power controller to control power flow in the transmission line,
wherein the controller is configured to switch to power circulation set point control between the coupled first and second voltage-sourced converters when at least one of the first voltage-sourced converter and the second voltage-sourced converter is at an operating limit.

2. The power flow controller of claim 1, wherein the circulating power demand is determined in real-time.

3. The power flow controller of claim 1, where the circulating power demand is determined from a look-up table.

4. The power flow controller of claim 1, wherein the circulating power demand is determined automatically and continuously using a closed-loop feedback system.

5. The power flow controller of claim 1, wherein the controller implements a vector control scheme that regulates transmission line current using a synchronous reference frame.

6. The power flow controller of claim 1, wherein the first and second voltage-sourced converters are configured as a Unified Power Flow Controller (UPFC).

7. The power flow controller of claim 6, wherein the first voltage-sourced converter is operating at MVA rating and the circulating power demand $P_{cd}$, is based on a solution to a set of load flow equations given by $$\sqrt{P_{se}^2+Q_{se}^2}=S_{se\ max},$$

wherein $Q_{se}$ is given by $$Q_{se} = \frac{-(V_1(V_1 - V_{m2}\cos(\theta_1 - \alpha_2)) + V_2(V_2 + V_{m2}\cos(\theta_2 - \alpha_2)))}{X_{t2}},$$

and $P_{se} = P_{cd}$, and a second set of load flow equations for the second voltage-sourced converter given by $$V_1=V_{1d}$$

and $$P_{sh}=-P_{cd}.$$

8. The power flow controller of claim 6, wherein the first voltage source converter is operating at a voltage magnitude limit $V_{m2max}$, and the circulating power demand $P_{cd}$ is based on a solution to a first set of loadflow equations given by $$V_{m2}=V_{m2max}$$

$$P_{se}=P_{cd},\ \text{and}$$

a second set of load flow equations for the second voltage-sourced converter given by $$V_1=V_{1d}$$

and $$P_{sh}=-P_{cd}.$$

9. The power flow controller of claim 6, wherein the second voltage-sourced converter is operating at MVA rating and the circulating power demand $P_{cd}$ is based on a solution to a set of loadflow equations given by $$\sqrt{P_{sh}^2+Q_{sh}^2}=S_{sh\ max},$$

wherein $Q_{sh}$ is given by $$Q_{sh} = \frac{-V_1(V_{m1}\cos(\theta - \alpha_1) - V_1)}{X_{t1}},\ \text{and}\ P_{sh} = -P_{cd},$$

and a second set of loadflow equations for the second voltage-sourced converter given by $$\frac{V_2(V_{m2}\sin(\theta_2 - \alpha_2) - V_1\sin(\theta_2 - \theta_1))}{X_{t2}} = P_d,\ \text{and}\ P_{se} = P_{cd}.$$

10. The power flow controller of claim 6, wherein the second voltage-sourced converter is operating at a current magnitude limit $I_{sh\ max}$, and the circulating power demand $P_{cd}$ is based on a solution to a first set of loadflow equations given by $$\frac{|V_1 \varepsilon^{j\theta_1} - V_{ml}\varepsilon^{j\alpha_1}|}{X_{tl}} = I_{sh\,max}$$

$P_{sh} = -P_{cd}$, and a second set of loadflow equations for the second voltage-sourced converter given by $$\frac{V_2(V_{m2}\sin(\theta_2 - \alpha_2) - V_1 \sin(\theta_2 - \theta_1))}{X_{t2}} = P_d, \text{ and } P_{se} = P_{cd}.$$

11. The power flow controller of claim 6, wherein the first and second voltage-sourced converters are operating at MVA rating and the circulating power demand $P_{cd}$ is based on a solution to a set of loadflow equations given by $$\sqrt{P_{se}^2 + Q_{se}^2} = S_{se\,max},$$

wherein $Q_{se}$ is given by $$Q_{se} = \frac{-(V_1(V_1 - V_{m2}\cos(\theta_1 - \alpha_2)) + V_2(V_2 + V_{m2}\cos(\theta_2 - \alpha_2)))}{X_{t2}},$$

$$\sqrt{P_{sh}^2 + Q_{sh}^2} = S_{sh\,max},$$

wherein $Q_{sh}$ is given by $$Q_{sh} = \frac{-V_1(V_{ml}\cos(\theta - \alpha_1) - V_1)}{X_{tl}},$$

$P_{sh} = -P_{cd}$, and $P_{se} = P_{cd}$.

12. The power flow controller of claim 6, wherein the first voltage-sourced converter is operating at a voltage magnitude limit $V_{m2\,max}$ and the second voltage-sourced converter is operating at a current magnitude limit $I_{sh\,max}$, and the circulating power demand $P_{cd}$ is based on a solution to a set of loadflow equations given by $$V_{m2} = V_{m2\,max},$$

$$\frac{|V_1 \varepsilon^{j\theta_1} - V_{ml}\varepsilon^{j\alpha_1}|}{X_{tl}} = I_{sh\,max},$$

$P_{se} = P_{cd}, P_{se} = P_{cd}.$

13. The power flow controller of claim 1, wherein the first and second voltage-sourced converters are configured as an Interline Power Flow Controller (IPFC).

14. The power flow controller of claim 1, wherein the power flow controller includes a third voltage-sourced converter and is configured as a Generalized Unified Power Flow Controller (GUPFC).

15. A method of controlling power flow in a transmission line using a power flow controller operated at rated capacity, comprising:

determining if a power flow controller coupled to the transmission line is operating at rated capacity;

determining a circulating power demand in response to the power flow controller operating at rated capacity; and configuring the power flow controller based on the circulating power demand to control power flow in the transmission line, wherein the configuring includes setting the power flow controller to include power circulation set point control between at least two coupled voltage-sourced converters if the transmission line is operating at rated capacity.

16. The method of claim 15, wherein the step of determining the circulating power demand further comprises:

determining a desired voltage-stability margin for a bus on the transmission line;

determining a power flow adjustment that will maintain the desired voltage-stability margin on the bus; and determining a circulating power demand that will provide the maximum power flow adjustment while maintaining the desired voltage-stability margin on the bus.

17. The method claim 15, wherein the circulating power demand is determined from predetermined voltage collapse curves.

18. The method claim 15, wherein circulating power demand is determined automatically from predetermined voltage collapse curves.

19. A computer-readable medium having stored thereon instructions which, when executed by a processor in a power flow control system coupled to a transmission line, causes the processor to perform the operations of:

determining a desired voltage-stability margin for a bus on the transmission line; determining a power flow adjustment that will maintain the desired voltage-stability margin on the bus; and determining a circulating power demand that will provide the maximum power flow adjustment while maintaining the desired voltage-stability margin on the bus, wherein the determining the circulating power demand includes power circulation set point control between at least two coupled voltage-sourced converters.

20. The computer-readable medium of claim 19, wherein the circulating power demand is determined from predetermined voltage collapse curves.

21. The computer-readable medium of claim 19, wherein circulating power demand is determined automatically from a look-up table.

22. A system for controlling power flow in a transmission line using a power flow controller operated at rated capacity, comprising:

means for determining if a power flow controller coupled to the transmission line is operating at rated capacity;

means for determining a circulating power demand in response to the power flow controller operating at rated capacity; and means for configuring the power flow controller based on the circulating power demand to control power flow in the transmission line, wherein the power flow controller is configured to include power circulation set point control between at least two coupled voltage-sourced converters if the transmission line is operating at rated capacity.

* * * * *